(12) United States Patent
Feldman et al.

(10) Patent No.: US 7,484,109 B2
(45) Date of Patent: Jan. 27, 2009

(54) COMPUTER VOLATILE MEMORY POWER BACKUP SYSTEM

(75) Inventors: Daniel Feldman, Forest Hills, NY (US); Arkadiy Peker, New Hyde Park, NY (US); Dror Korcharz, Bat Yam (IL); Simon Kahn, Jerusalem (IL); Ilan Atias, Haifa (IL); Mohamad A. Saleh, Framingham, MA (US)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 343 days.

(21) Appl. No.: 11/223,030

(22) Filed: Sep. 12, 2005

(65) Prior Publication Data

US 2006/0224907 A1    Oct. 5, 2006

Related U.S. Application Data

(60) Provisional application No. 60/666,575, filed on Mar. 31, 2005, provisional application No. 60/690,137, filed on Jun. 14, 2005.

(51) Int. Cl.
*G06F 1/26* (2006.01)

(52) U.S. Cl. ........................... 713/300; 713/323; 714/14

(58) Field of Classification Search ................. 713/300, 713/320, 323; 714/14, 22
See application file for complete search history.

(56) References Cited

U.S. PATENT DOCUMENTS

| | | | | |
|---|---|---|---|---|
| 4,458,307 A * | 7/1984 | McAnlis et al. | ............... | 714/22 |
| 4,885,632 A * | 12/1989 | Mabey et al. | ................. | 725/20 |
| 5,629,694 A | 5/1997 | Simon et al. | ................... | 341/22 |
| 5,630,155 A * | 5/1997 | Karaki et al. | ............... | 713/340 |
| 5,748,971 A * | 5/1998 | Choi et al. | ................... | 713/320 |
| 5,978,922 A * | 11/1999 | Arai et al. | ................... | 713/323 |
| 6,226,556 B1 | 5/2001 | Itkin et al. | | |
| 6,263,453 B1 * | 7/2001 | Anderson | ..................... | 714/22 |
| 6,274,949 B1 | 8/2001 | Lioux et al. | .................. | 307/64 |
| 6,462,437 B1 * | 10/2002 | Marmaropoulos et al. | .. | 307/125 |
| 6,473,608 B1 | 10/2002 | Lehr et al. | .................. | 455/402 |
| 6,523,125 B1 | 2/2003 | Kohno et al. | ................. | 713/320 |
| 6,538,344 B1 | 3/2003 | Yang et al. | ..................... | 307/66 |
| 6,597,074 B2 | 7/2003 | Tsujikado et al. | ............. | 307/66 |

(Continued)

OTHER PUBLICATIONS

U.S. Appl. No. 60/488,700, filed Jul. 2003, Hancock et al.*

(Continued)

*Primary Examiner*—Chun Cao
(74) *Attorney, Agent, or Firm*—Simon Kahn

(57) ABSTRACT

A system for placing and maintaining a computer in a standby mode during power failure, utilizing one of: a powered device controller exhibiting a maintain power signature functionality and arranged to receive power over communication cabling; and a MEMS flywheel energy system to provide a standby power. The standby power is less than the power required for full operation. In one embodiment the system additionally exhibits: a mains power failure sensor; a volatile memory arranged to be powered from the source of standby power in the event of a failure of mains power; and a processor operative responsive to the mains power failure sensor to store status information on the volatile memory and reduce power demand of the processor and associated devices to no more than that available from the source of standby power.

37 Claims, 21 Drawing Sheets

U.S. PATENT DOCUMENTS

| | | | |
|---|---|---|---|
| 6,618,813 B1 | 9/2003 | Hsu et al. | 713/323 |
| 6,643,566 B1 | 11/2003 | Lehr et al. | 700/286 |
| 6,665,404 B2 | 12/2003 | Cohen | |
| 6,768,224 B2 | 7/2004 | Shen et al. | 307/64 |
| 6,880,093 B1 * | 4/2005 | Lyles | 713/300 |
| 7,194,639 B2 * | 3/2007 | Atkinson et al. | 713/300 |
| 7,294,940 B2 | 11/2007 | Grolnic et al. | |
| 2002/0062455 A1 | 5/2002 | Lee | 713/323 |
| 2004/0103343 A1 * | 5/2004 | Wu et al. | 714/14 |
| 2004/0148531 A1 | 7/2004 | Yamazaki et al. | 713/300 |
| 2005/0246557 A1 | 11/2005 | Vanzante | 713/300 |
| 2006/0019629 A1 | 1/2006 | Berson | |
| 2006/0063509 A1 | 3/2006 | Pincu | |

OTHER PUBLICATIONS

Day, Michael, "Power over Ethernet: One Cable Fits All", Jul. 19, 2004; http://www.networkworld.com/newsletters/techexec/2004/0719techexec1.htm/.

* cited by examiner

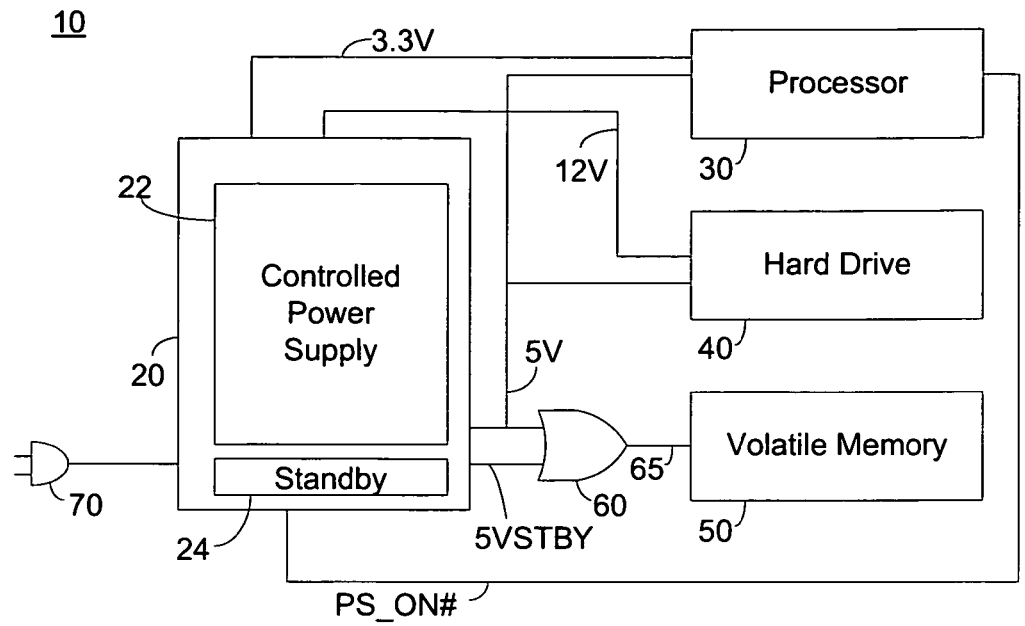
Fig. 1a  *Prior Art*
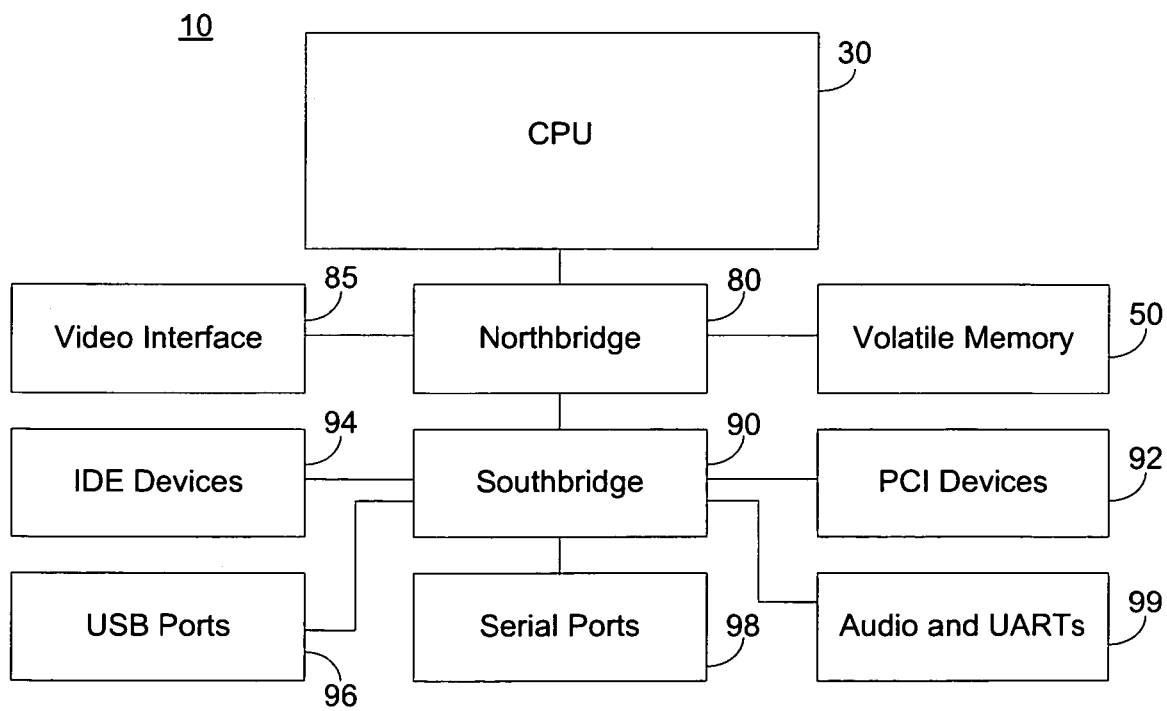
Fig. 1b  *Prior Art*

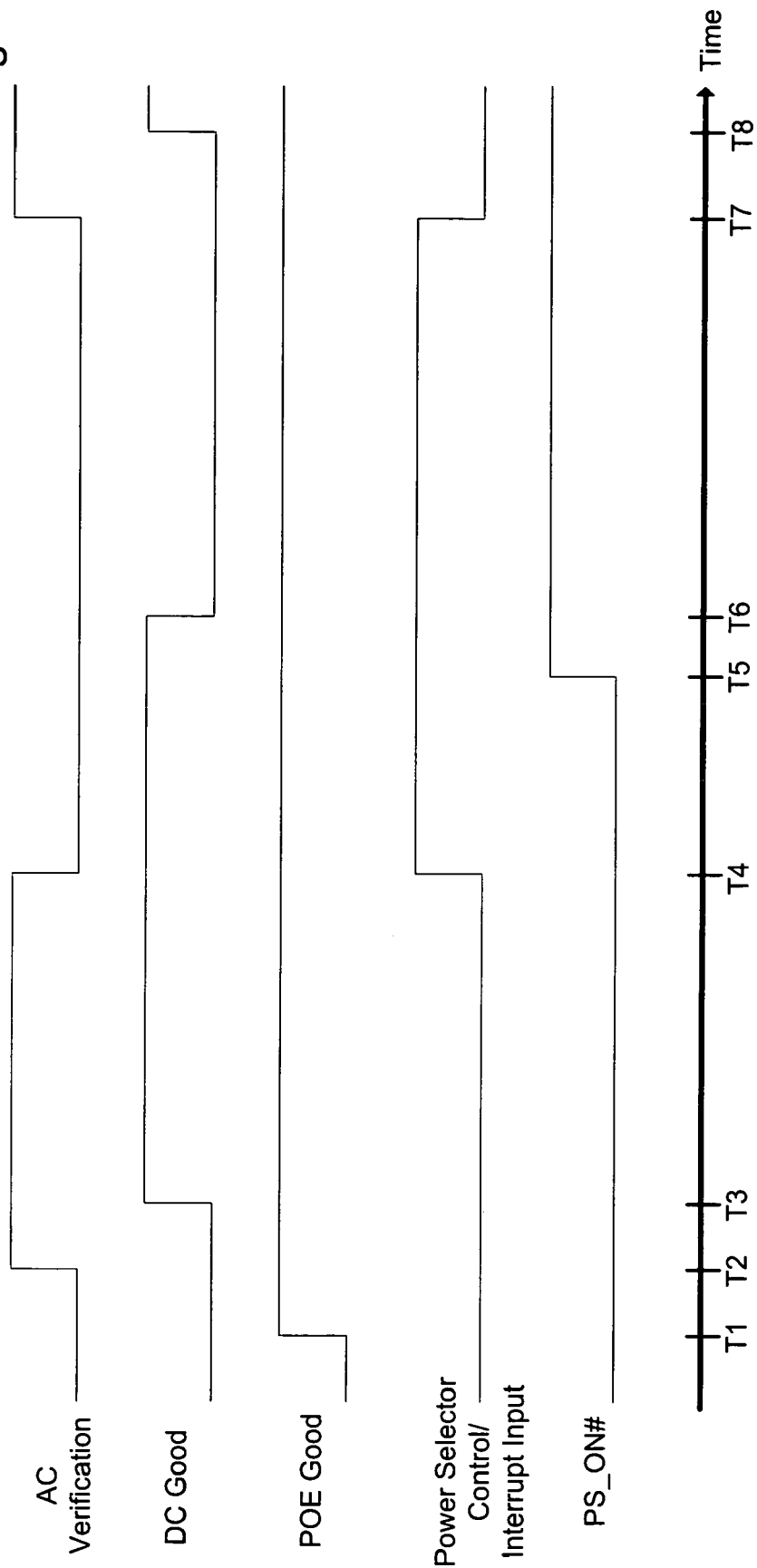

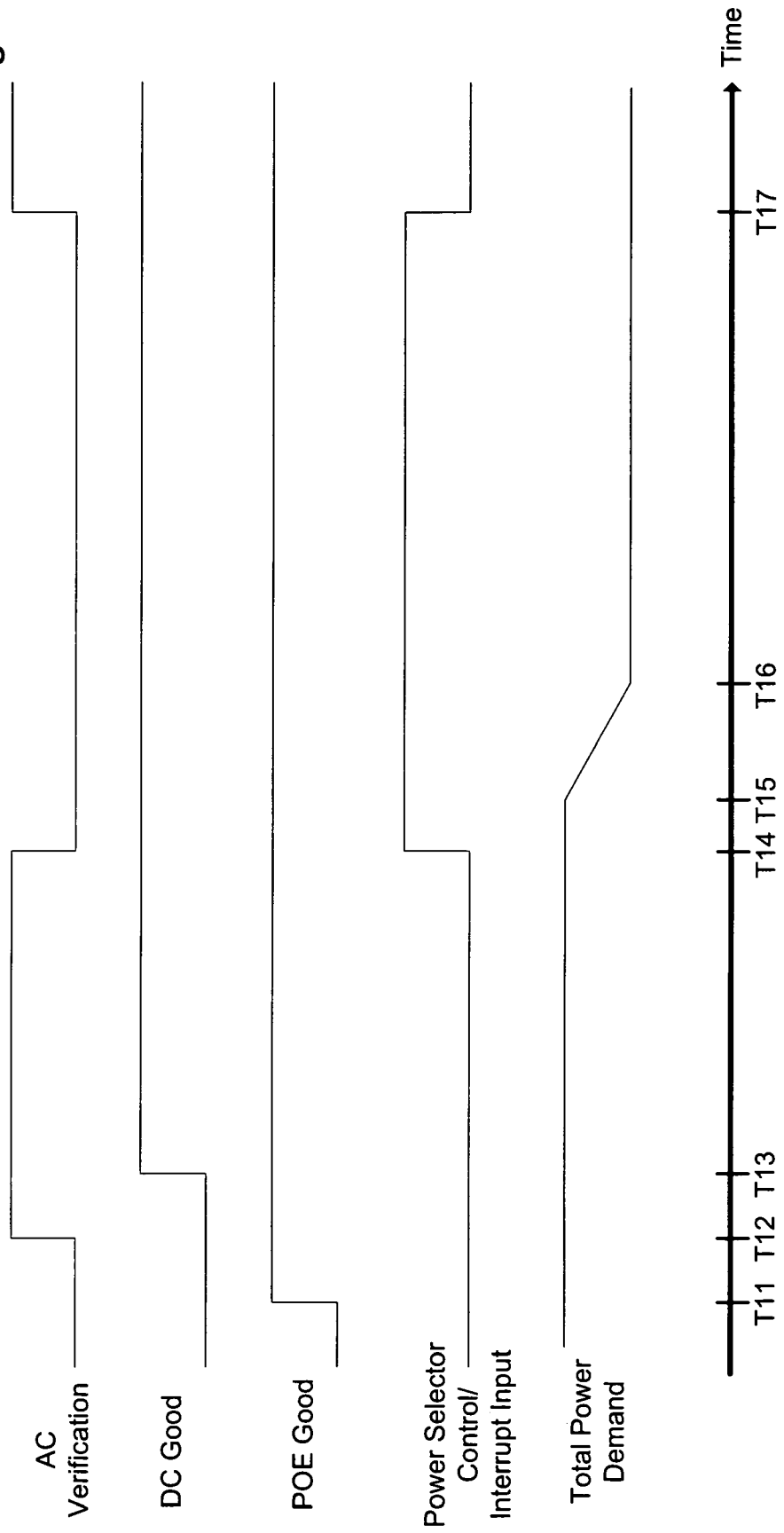

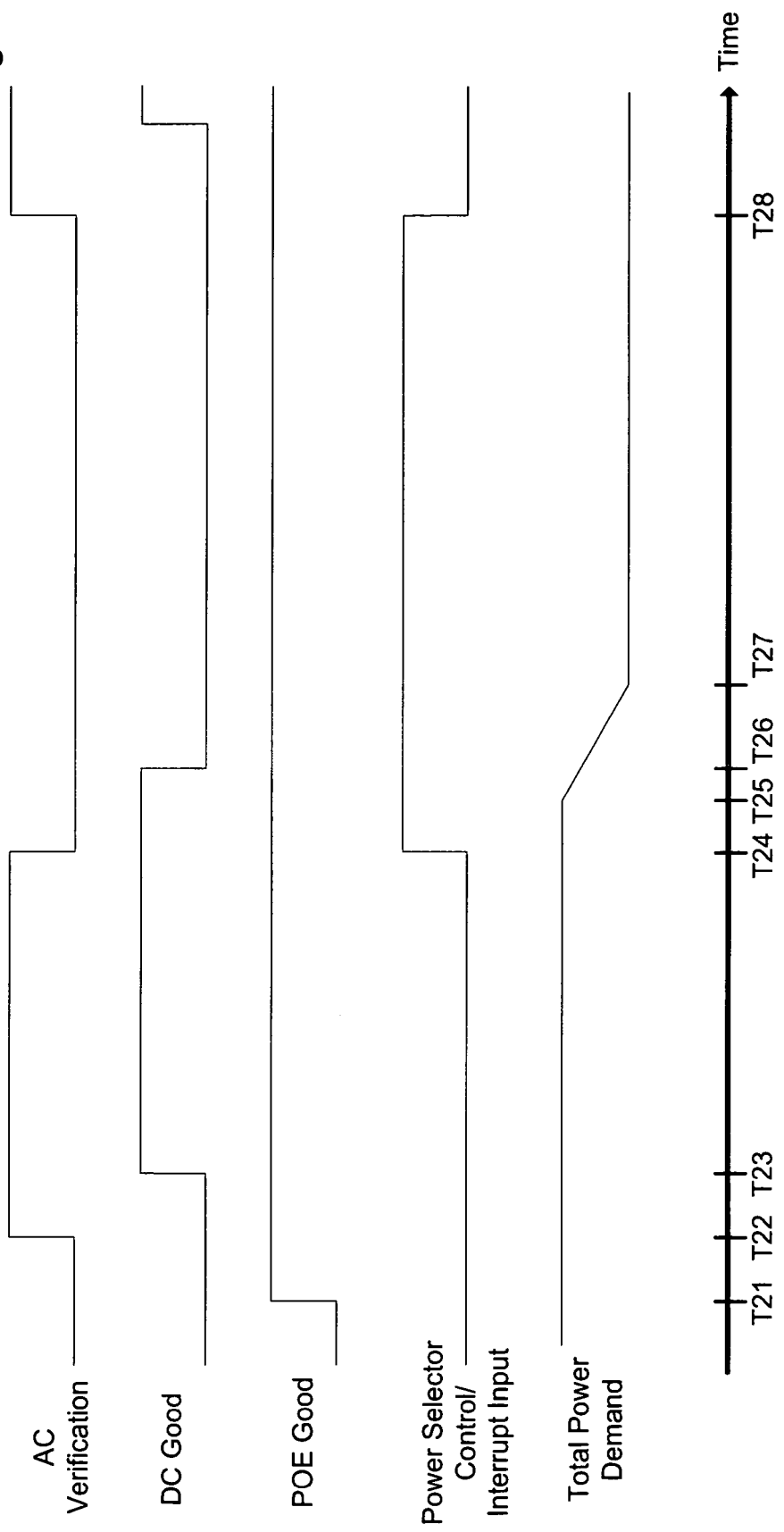

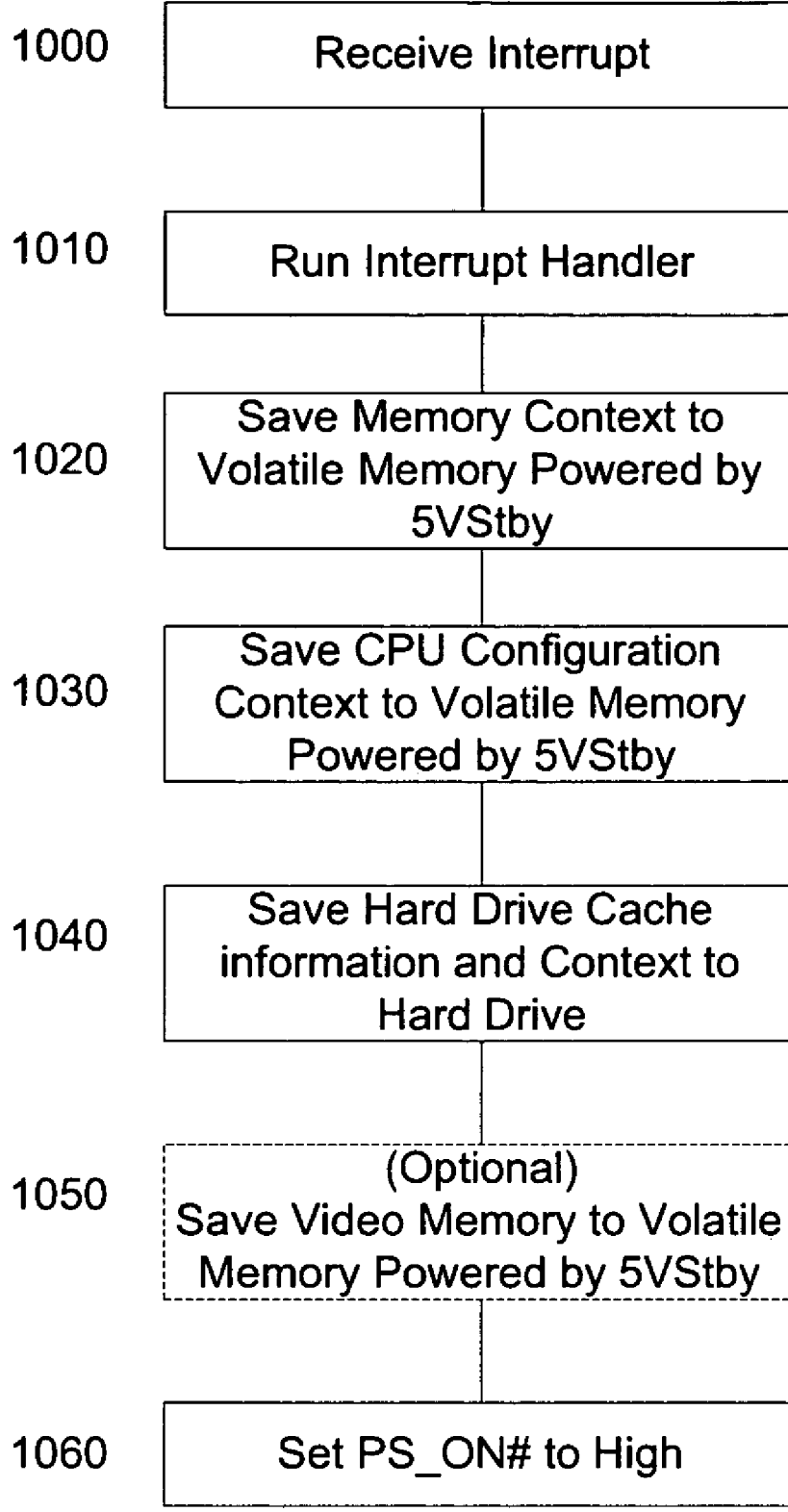

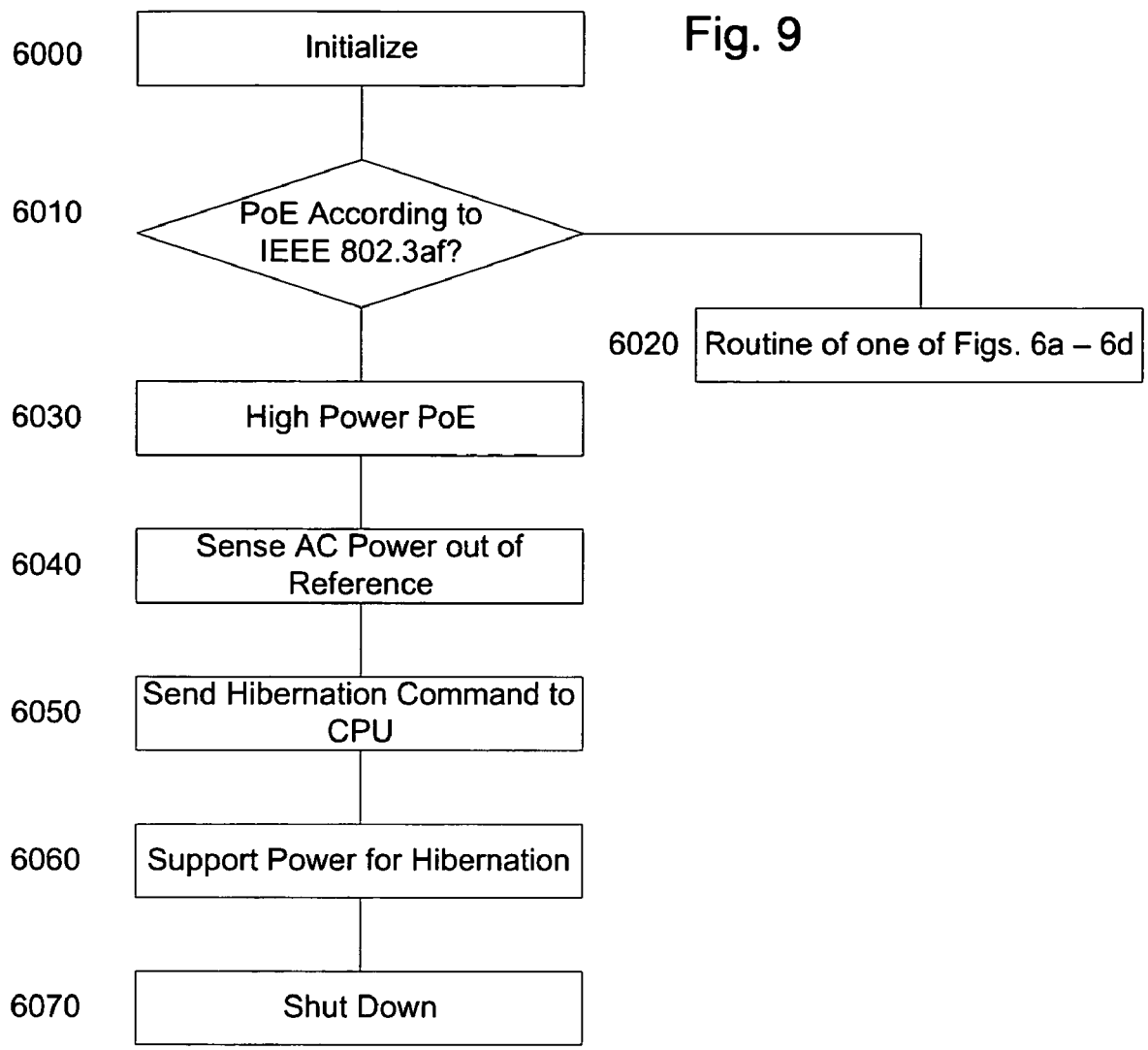

COMPUTER VOLATILE MEMORY POWER BACKUP SYSTEM

CROSS-REFERENCE TO RELATED APPLICATIONS

This application claims priority from U.S. Provisional Patent Application Ser. No. 60/666,575 filed Mar. 31, 2005 entitled "Computer Power Back-Up Utilizing Power Over Ethernet", and U.S. Provisional Patent Application Ser. No. 60/690,137 filed Jun. 14, 2005 entitled "Computer Volatile Memory Power Backup System" the entire contents of each of which are incorporated herein by reference. This application is related to co-pending, and co-filed, patent application Ser. No. 11/2221,791 entitled "Computer Volatile Memory Power Backup System".

BACKGROUND OF THE INVENTION

The present invention relates to the field of backup powering, and more particularly to a means for backing up a computer during mains power failure by powering a volatile memory, preferably by utilizing power over Ethernet.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af, whose contents are incorporated herein by reference.

Power over Ethernet (PoE) supplies a limited amount of power to an attached powered device, with the aforementioned standard limiting the average input power of a powered device to a maximum of 12.95 watts. Computers, and in particular desktop computers, are powered by an electrical mains connection and typically draw well in excess of 15 watts. In the event of a failure of mains power the computer power supply maintains power for at least one cycle of mains power, i.e. 17-20 ms. The time period for which power is maintained in the absence of mains power is called the hold up time. At the expiration of the hold up time, computer power is no longer reliably supplied and both the processor state and all information in volatile memory of the computer is lost. Similarly any information stored in video memory, such as fonts being displayed on the screen, is lost. A prior art solution to this difficulty entails supporting each computer with an uninterruptible power supply (UPS), which is designed to reliably supply power for a period of time after loss of mains power. Typically a warning is given by the UPS to the user, enabling the user to store all information in a non-volatile memory and shut down the computer in an orderly fashion. In another prior art solution the UPS is connected by a network connection to the computer, and initiates an orderly shut down of all running programs. Typically the UPS supplies power for a number of minutes enabling an orderly shut down if prompt action is taken.

The provision of a UPS for each computer is costly and requires additional space at each computer location. Furthermore, maintenance of a separate UPS at each computer adds to overhead. Alternatively a centralized UPS is provided supplying power over dedicated AC wiring to each computer to be supported. Such a dedicated wiring is costly to install and expensive to modify when changing the location of computers.

Modern computers are designed with certain power saving features as exemplified in the advanced computer power interface (ACPI) standard. In particular, standby modes or sleeping states are defined in which information including all registers defining the processor's state are stored in volatile memory. Power is subsequently shut down to the processor, hard drive and monitor with power being supplied exclusively to a standby memory power bus. Such a mode of operation is defined for example in the Intel ACPI 3.0 standard. In order to achieve an Energy Star rating from the U.S. Environmental Protection Agency computers must consume significantly reduced power in a standby mode. In order to meet U.S. Government Guidelines as embodied in an Executive Order dated Jul. 31, 2001, appliances including computers to be purchased by the U.S. Government are preferably to consume less than 1 watt in standby.

An exemplary embodiment of a computer architecture supporting ACPI 3.0 is illustrated in FIG. 1. Computer 10 comprises: a power supply unit 20 comprising a controlled power supply 22 and a standby power supply 24; a CPU 30; a hard drive 40; a volatile memory 50; an ORing circuit 60; a standby power bus 65; and an AC mains connection 70. Power supply 20 receives power from AC mains connection 70 and controlled power supply 22 of power supply unit 20 is responsive to an output signal from CPU 30 labeled PS_ON# as will be explained further hereinto below. Controlled power supply 22 outputs a plurality of voltages including 5 volts, 3.3 volts and 12 volts. Standby power supply 24 output a separate 5 volt output, labeled 5V STBY which is unaffected by the state of PS_ON#. The 5 volt output is fed to CPU 30 and hard drive 40 and is connected to one input of ORing circuit 60. The 5 volt standby output is connected to a second input ORing circuit 60, and the output of ORing circuit 60 is connected to volatile memory 50 via standby power bus 65. Other devices may receive power from the standby power supply 24 as well.

In operation, when AC mains power is available from AC mains connection 70 and responsive to a active low signal PS_ON#, power is supplied via the plurality of power outputs of controlled power supply 22 to CPU 30 and hard drive 40. Power is further supplied via the 5 volt output of controlled power supply 22 through ORing circuit 60 to volatile memory 50 over standby power bus 65. In the event that a logic high signal appears on PS_ON#, controlled power supply 22 responsive to the logic high signal removes power from the 5 volt output, the 3.3 volt output and the 12 volt output. However power is still supplied via standby power supply 24 via ORing circuit 60 to volatile memory 50 and any other devices connected to the 5 volt standby line. Furthermore devices requiring other voltages that are supplied exclusively from controlled power supply 22 are not powered unless a dual supply arranged is provided. Such an arrangement is well known to those skilled in the art and is commercially available, for example via the use of a Fairchild FAN5063 Dual Switch Controller available from Fairchild Semiconductor of South Portland, Me.

In computers designed to support this architecture power supply 20 is responsive to the PS_ON# signal generated by CPU 30, and in particular by a power management interface (not shown) of a chip set associated with CPU 30. Thus, to proceed to a standby mode, CPU 30 first acts to store all information including status registers in volatile memory 50 prior to setting the value of PS_ON# to high. In one embodiment this is accomplished by enabling a system management mode (SMM). Unfortunately, in the event of a loss of AC mains power, CPU 30 lacks sufficient time and warning to proceed to the standby mode in an orderly fashion, as the hold up time of 17-20 milliseconds is insufficient. Furthermore, no mechanism is supplied to initiate the standby mode in the event of a loss of AC mains power. Additionally, in the event of a loss of AC mains power, there is no source of electrical power to maintain power bus 65.

The above has been described as utilizing an ORing circuit 60, however this is not meant to be limiting in any way. In particular, in one embodiment ORing circuit 60 is replaced with a plurality of FET switches in series, the first of the FET switches feeding power to memory 50 and to the input of subsequent switches. Such an embodiment is described in U.S. Pat. No. 6,523,125 issued Feb. 18, 2003 to Kohno et al entitled "System and Method for Providing a Hibernation Mode in an Information Handling System", the entire contents of which is incorporated herein by reference. In another embodiment ORing circuit 60 comprises a dual switch controller such as the Fairchild FAN5063 described above.

FIG. 1b is a high level schematic diagram illustrating a chipset system block diagram of computer 10 supporting the advanced configuration power interface according to the prior art. Computer 10 comprises CPU 30; a northbridge 80; volatile memory 50; a video interface 85; a southbridge 90; IDE devices 94; USB ports 96; serial ports 98; and audio and UARTs 99. The operating system running on computer 10 implements the ACPI and controls power useage of each of the connected devices including that of CPU 30. Northbridge 80 interfaces directly with a processor system bus of CPU 30 and is connected thereto. Video interface 85, which in one embodiment may comprise one or more of: a cathode ray tube display; a digital video output; a low voltage digital signal interface; and an accelerated graphics port interface, is connected to northbridge 80. Volatile memory 50, which in an exemplary embodiment comprises synchronous dynamic random access memory is connected to northbridge 80.

Southbridge 90 is connected to northbridge 80 and has connected thereto IDE devices 94; USB ports 96; serial ports 98; and audio and UARTs 99. Thus, northbridge 80 communicates directly with CPU 30, and southbridge 90 communicates with CPU 30 via northbridge 80. The ACPI is operable to control power useage of each of the connected devices and to place any of the devices in computer 10, including CPU 30 into a reduced power consumption mode.

Unfortunately, the ACPI is unable to reduce power consumption in the event of a mains power failure, as operating power for computer 10 is not supplied. Furthermore, in the event of a mains power failure, power is not supplied for volatile memory 50, and thus in the absence of supplied power all information stored thereon is lost.

The above has been described in relation to a computer exhibiting a northbridge/southbridge architecture, however this is not meant to be limiting in any way. Other architectures, specifically including an Intel Hub Architecture exhibit similar issues regarding powering and loss of information and processor state upon AC mains failure.

What is needed, and not supplied by the prior art, is an automatic means for preventing the loss of information in a computer during a power failure while not requiring a UPS or other large battery back up system.

SUMMARY OF THE INVENTION

Accordingly, it is a principal object of the present invention to overcome the disadvantages of prior art. This is provided in the present invention by sensing a failure of AC mains power prior to the loss of output from the power supply, preferably at the beginning of a lost power cycle. An interrupt is generated, and the processor responsive to the interrupt calls a routine to store system context, memory context, pre-selected CPU and configuration context, and optionally video memory onto a volatile memory prior to loss of operating power. Backup power is then supplied to the volatile memory during the AC mains failure.

In one embodiment, standby power is fed to the input of the computer power supply. The interrupt routine of the processor sends a logic high PS_ON# signal to the power supply, and the power supply responsive to the logic high signal shuts down all power outputs with the exception of the standby power supply. In an exemplary embodiment the interrupt routine reduces the power demand to the amount available from the backup power before the loss of output derived from the AC mains supplied power supply. In another embodiment any short term power mismatch is supported by energy storage in a capacitor, the capacitor preferably being arranged to store energy of a high voltage. Power is thus supplied for the volatile memory via the standby power supply of the computer, the power for the standby power supply being delivered from the backup power source.

In one embodiment the reduction in power demand is a result of the interrupt routine powering down devices receiving power from the power supply. In an exemplary embodiment the control hub or southbridge is powered down thereby reducing power requirements to a level supportable by the backup power source.

In another embodiment, backup power operates a plurality of DC/DC converters the output of which are ORed with each of respective plurality of voltage outputs of the computer power supply. Power is thus maintained for all devices of the computer for a sufficient amount of time to enable the interrupt routine to complete its storage operation. In one further embodiment the interrupt routine powers down devices thus reducing the total power demand to less than or equal to the amount of available backup power. In an exemplary embodiment the control hub or southbridge is powered down thereby reducing power requirements to a level supportable by the backup power. Power is thus supplied for the volatile memory via a separate power supply from the main computer power supply, the separate power supply receiving its power from the backup power source.

In one embodiment, the interrupt calls a routine which generates an S3 sleeping state as described in the ACPI 3.0 specification. In another embodiment, the S2 sleeping state of the above specification is generated. In one embodiment the backup power is supplied by a battery to the volatile memory.

The invention provides for A system for placing and maintaining a computer in a standby mode during power failure, the system comprising: a means for sensing a failure of mains power; a means for providing a standby power, the standby power being less than the power available for full operation; a volatile memory arranged to be powered via the means for providing a standby power; and a processor, the processor being operative responsive to the means for sensing a failure to store status information on the volatile memory and reduce power demand of the computer to be no more than that available from the means for providing a standby power.

In one embodiment the processor is operative responsive to the means for sensing a failure via a system management interrupt. In another embodiment the processor is operative responsive to the means for sensing a failure via an interrupt.

In one embodiment the system further comprises a power supply exhibiting a first power output and at least one second power output, the power supply being responsive to a signal from the processor to disable power to at least one of the second power outputs while powering the first power output, the power supply being arranged to receive power from the means for providing a standby power in the event of a sensed failure of mains power, the volatile memory being arranged to be powered via the first power output thereby being powered via the means for providing a standby power. Preferably the power supply responsive to the signal is operative to reduce the power demand to less than the amount of power available from the means for providing a standby power.

In one embodiment the system further comprises a DC/DC converter associated with the means for providing a standby power, the volatile memory arranged to be powered via the means for providing a standby power being powered via the DC/DC converter. In another embodiment the processor is operative to store the status information within 17 milliseconds of the sensed failure of mains power.

In one embodiment the volatile memory comprises a disk cache. In another embodiment the status information comprises at least some contents of a video memory.

In one embodiment the status information comprises a configuration of at least one of a network card and a sound card. In another embodiment the means for providing a standby power comprises a powered device controller operable to receive power over communication cabling. Preferably the system further comprises a means for sensing the received power, the processor being operative responsive to the means for sensing a failure and the means for sensing the received power. Preferably the powered device controller meets the IEEE 802.3af standard.

In one embodiment the means for sensing a failure comprises an analog to digital converter, the means for sensing a failure being operative to compare an output of the analog to digital converter to a reference. In another embodiment the means for sensing a failure comprises a digital to analog converter, the means for sensing a failure being operative to compare an output of the converter to a signal responsive to the mains power.

In one embodiment the processor is operative in a kernel mode to store the status information. In another embodiment the processor is operative under a BIOS routine to store the status information.

In one embodiment the system further comprises a means for sensing restoration of the failed mains power, the processor being operative responsive to the means for sensing restoration to retrieve the status information from the volatile memory. In another embodiment the means for providing a standby power comprises one of a battery, a capacitor, a flywheel energy storage system and a power over Ethernet connection. In yet another embodiment the means for providing a standby power comprises a flywheel energy storage system of the micro-electromechanical system (MEMS) variety.

Independently, the invention provides for a system for placing and maintaining a computer in a standby mode during power failure, the system comprising: a mains power failure sensor; a source of standby power, the source of standby power being less than the power available for full operation; a volatile memory arranged to be powered from the source of standby power in the event of a failure of mains power; and a processor operative responsive to the mains power failure sensor to store status information on the volatile memory and reduce power demand of the processor and associated devices to no more than that available from the source of standby power.

In one embodiment the processor is operative responsive to the mains power failure sensor via a system management interrupt. In another embodiment the processor is operative in one of a kernel mode and a BIOS routine responsive to the mains power failure sensor.

In one embodiment the source of standby power comprises one of a battery, a capacitor, a flywheel energy storage system and a power over Ethernet connection. In another embodiment the source of standby power comprises a flywheel energy storage system of the micro-electromechanical system (MEMS) variety.

In one embodiment the system further comprises a mains power restoring sensor, said processor being further operative responsive to said mains power restoring sensor to restore said status information from said volatile memory. In another embodiment the processor is operative to restore said status information without requiring a reboot of the computer.

Independently the invention provides for a method of backing up a computer in the event of mains power failure, the method comprising: providing a source of standby power; providing a volatile memory; sensing a failure of mains power; interrupting a processor responsive to the sensing; storing status information associated with the processor on the provided volatile memory; and powering the volatile memory from the provided source of standby power thereby retaining the stored status information during the sensed failure of mains power.

In one embodiment the interrupting is via a system management interrupt. In another embodiment the method further comprises: providing a power supply exhibiting a first power output and at least one second power output; in the event of the failure of mains power, powering the provided power supply from the source of standby power; and disabling power to at least one of the second power outputs while powering the first power output, wherein the powering the volatile memory from the source of standby power is at least partially via the power supply. Preferably, the step of disabling power reduces the power demand of the computer to less than the amount of power available from the source of standby power.

In one embodiment the method further comprises providing a voltage converter associated with the provided source of standby power, wherein the powering the volatile memory from the provided source of standby power is at least partially via the provided voltage converter. In another embodiment the step of storing status information is accomplished within 17 milliseconds of the sensed failure of mains power.

In one embodiment the volatile memory comprises a disk cache. In another embodiment the status information comprises at least some contents of a video memory. In yet another embodiment the status information comprises a configuration of at least one of a network card and a sound card.

In one embodiment the provided source of standby power is associated with power over Ethernet. In another embodiment the step of storing is accomplished by the processor operative in one of a kernel mode and a BIOS routine. In another embodiment the method further comprises: sensing restoration of the failed mains power; and retrieving the status information from the volatile memory.

In one embodiment the provided source of standby power comprises one of a battery, a capacitor, a flywheel energy storage system and a power over Ethernet connection. In another embodiment the provided source of standby power comprises a flywheel energy storage system of the microelectromechanical system (MEMS) variety.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1a is a high level schematic diagram illustrating power supply connections of a computer supporting the advanced configuration power interface according to the prior art;

FIG. 1b is a high level schematic diagram illustrating a chipset system block diagram of a computer supporting the advanced configuration power interface according to the prior art;

FIG. 4a is a timing diagram showing the relationship between certain signals in the architecture of FIG. 3a in accordance with the principle of the current invention;

FIG. 4b is a timing diagram showing the relationship between certain signals and total power demand in the architecture of FIG. 3b in accordance with the principle of the current invention;

FIG. 4c is a timing diagram showing the relationship between certain signals and total power demand in the architecture of FIG. 3c in accordance with the principle of the current invention;

FIG. 5 illustrates a high level flow chart of an embodiment of the operation of the CPU and Chipset of FIG. 3a in response to a power failure interrupt in accordance with the principle of the current invention;

FIG. 9 is a high level flow chart of the operation of an embodiment of the operation of the architecture of any of FIGS. 3a-3d according to the principle of the invention for alternative operation with high power over Ethernet or power over Ethernet in accordance with the power limits of IEEE802.3af.

DETAILED DESCRIPTION OF PREFERRED EMBODIMENTS

Figure 2A:
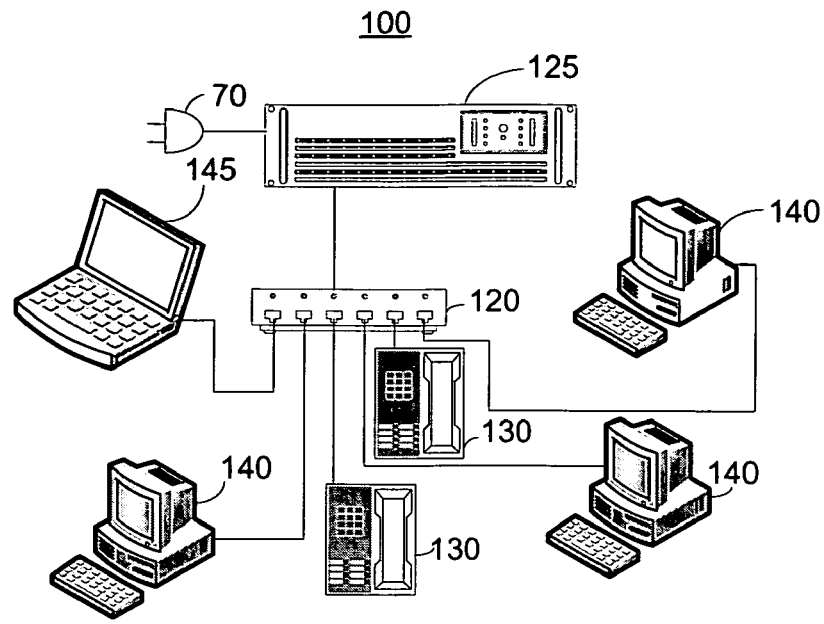
FIG. 2a is a high level block diagram of a network implementing power over Ethernet supplied from a switch to a plurality of nodes in accordance with the principle of the invention.

The present embodiments enable a backup of a computer in the event of power failure by powering a volatile memory, preferably by utilizing power over Ethernet. In particular, a failure of mains power is detected and an interrupt to the processor is generated, with the interrupt routine saving context information and data to volatile memory locations receiving backup power during mains failure. In an exemplary embodiment the interrupt routine initiates a sleeping state managed by an operating system.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 2a is a high level block diagram of a network 100 implementing PoE supplied from a switch to a plurality of nodes in accordance with the principle of the invention. Network 100 comprises a switch 120, a UPS 125, an AC mains connection 70, IP telephones 130, desktop computers 140 and laptop computer 145. AC mains connection 70 is connected to UPS 125, and UPS 125 is connected to supply power to switch 120. IP telephones 130, desktop computers 140 and laptop computer 145 are each connected in a star configuration to switch 120. Switch 120 is illustrated as supporting 6 ports, however this is not meant to be limiting in any way, and more ports or fewer ports may be supported without exceeding the scope of the invention. Switch 120 supplies both data switching and PoE preferably in accordance with IEEE 802.3af. A source of power for PoE is also known as power sourcing equipment (PSE). In the event of a failure of AC mains power, power for PoE applications is supplied by UPS 125. UPS 125 additionally supplies power for switch 120 during failure of AC mains power. Power supplied via PoE is herein also referred to herein interchangeably as a PoE connection or a PoE channel.

Figure 2B:
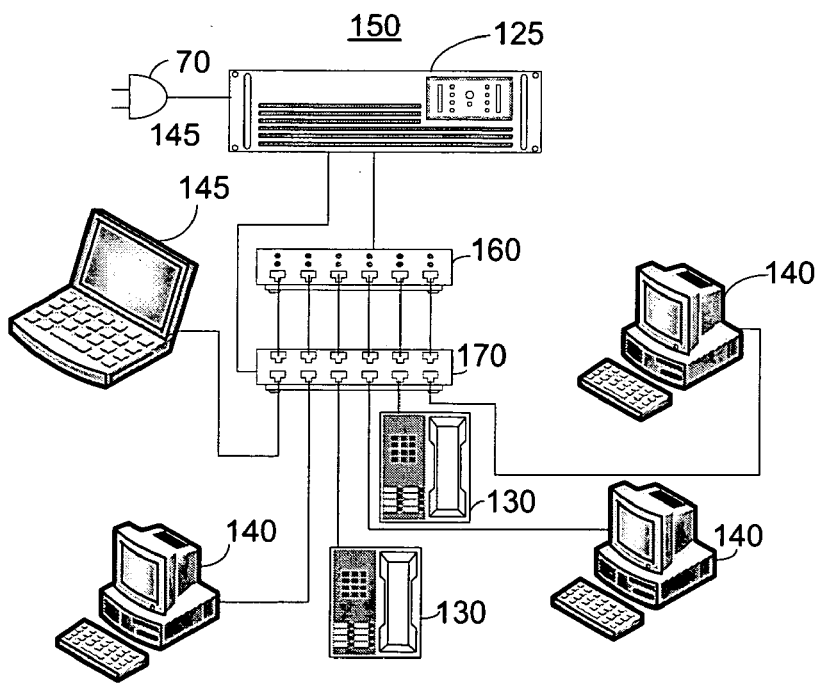
FIG. 2b is a high level block diagram of a network implementing power over Ethernet supplied from a midspan module to a plurality of nodes in accordance with the principle of the current invention.

FIG. 2b is a high level block diagram of a network 150 implementing PoE supplied from a midspan module to a plurality of nodes in accordance with the principle of the current invention. Network 150 comprises a switch 160, a midspan PSE 170, IP telephones 130, desktop computers 140, laptop computer 145, UPS 125 and AC mains connection 70. AC mains connection 70 is connected to UPS 125, and UPS 125 is connected to supply power to switch 160 and midspan PSE 170. IP telephones 130, desktop computers 140 and laptop computer 145 are each connected in a star configuration to midspan PSE 120. Each port of switch 160 is connected to a corresponding port of midspan power sourcing equipment 170.

Switch 160 and midspan PSE 170 are illustrated as each supporting 6 ports, however this is not meant to be limiting in any way, and more or fewer ports may be supported without exceeding the scope of the invention. Switch 160 and midspan PSE 170 need not support the same amount of ports. Switch 160 supplies data switching for all connected nodes, and midspan PSE 170 supplies PoE for all connected nodes preferably in accordance with IEEE 802.3af. In the event of a failure of AC mains power, power for PoE applications is supplied by UPS 125 to midspan PSE module 170 and from midspan PSE module 170 to each PoE powered node. Preferably UPS 125 additionally supplies power for switch 160 during failure of AC mains power.

Figure 3A:
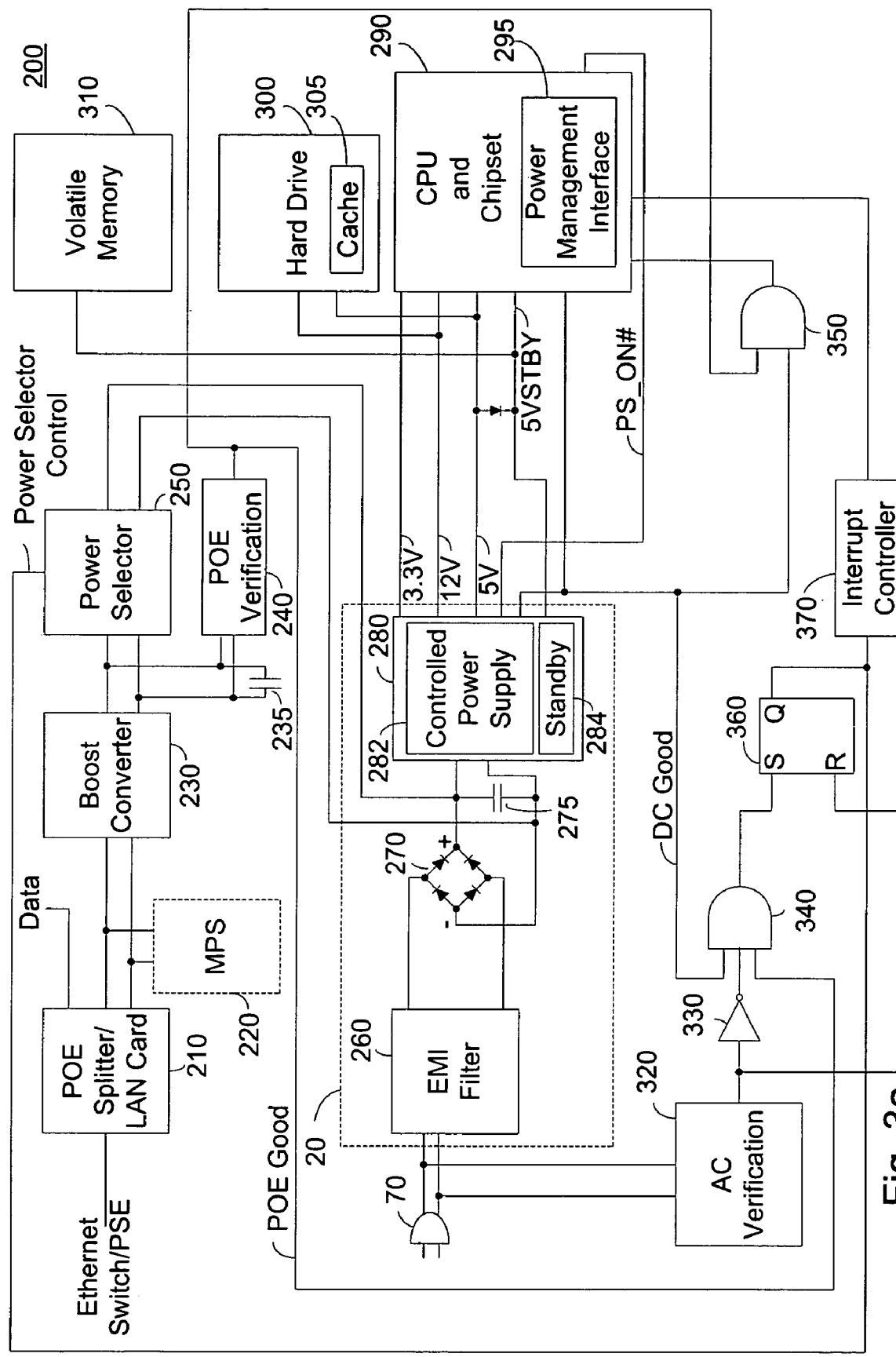
FIG. 3a is a high level block diagram of a first embodiment of an architecture for supplying backup power via power over Ethernet in accordance with the principle of the current invention.

FIG. 3a is a high level block diagram of a first embodiment of an architecture for a computer, denoted architecture 200, providing backup power via PoE in accordance with the principle of the current invention. Architecture 200 comprises: a PoE splitter and LAN card 210; an optional maintain power signature (MPS) functionality 220; a boost converter 230; a storage capacitor 235; a PoE verification 240; a power selector 250; AC mains connection 70; power supply 20 comprising an EMI filter 260, a diode bridge 270, a storage capacitor 275, and a power supply unit 280 comprising a controlled power supply 282 and a standby power supply 284; a CPU and Chipset 290 comprising a power management interface 295; a hard drive 300 comprising a cache memory 305; a volatile memory 310; an AC verification circuit 320; an inverter 330; an AND gate 340; an AND gate 350; an SR flip flop 360; and an interrupt controller 370.

PoE splitter and LAN card 210 is connected over data communication cabling to an Ethernet switch for data communications supplying PoE such as switch 120 of FIG. 2a, or to switch 160 supplying data communications and midspan PSE 170 supplying PoE of FIG. 2b. PoE splitter and LAN card 210 is described herein as a single card, however this is not meant to be limiting in any way. The PoE splitting functionality as described in the above reference IEEE 802.3af standard may be separate from the LAN card functionality without exceeding the scope of the invention. Furthermore LAN card functionality need not be supplied and PoE may be delivered over wire pairs not actively carrying data without exceeding the scope of the invention.

One connection of PoE splitter and LAN card 210 is connected to a data connection as is known to those skilled in the art, which in an exemplary embodiment comprises a physical layer connection known as a PHY. The power output of PoE splitter and LAN card 210 is connected to boost converter 230. Optional MPS functionality 220 is connected in parallel to boost converter 230, and in an exemplary embodiment is integrated within boost converter 230. The output of boost converter 230 is connected to power selector 250 and in parallel to PoE verification 240 and storage capacitor 235. The output of power selector 250 is connected to the input of power supply unit 280 across storage capacitor 275. The output of PoE verification 240, denoted "PoE Good" is connected to a first input of AND gate 340 and to a first input of AND gate 350.

AC mains connection 70 is connected to EMI filter 260 at the input of power supply 20 and in parallel to AC verification circuit 320. The output of EMI filter 260 is connected to the input of diode bridge 270 and the rectified output of diode bridge 270 is connected across storage capacitor 275 to the input of power supply unit 280. The output of AC verification circuit 320 is connected via inverter 330 to a second input of AND gate 340 and to the reset input of SR flip flop 360. An output of power supply unit 280 denoted "DC Good" is connected to a third input of AND gate 340, to a second input of AND gate 350 and to an input of CPU and Chipset 290. The output of AND gate 340 is connected to the set input of SR flip flop 360. The output of SR flip flop 360, denoted "Power Selector Control" is fed to the input of interrupt controller 370 and is further fed to the control input of power selector 250. The output of interrupt controller 370 is fed to an input of CPU and Chipset 290 and the output AND gate 350 is fed to an input of CPU and Chipset 290. An output of CPU and Chipset 290 denoted "PS_ON#" is connected to the remote powering control input of power supply unit 280. Power outputs denoted 3.3 V, 12 V, 5 V and 5 VSTBY of power supply unit 280 are shown connected to CPU and Chipset 290 however this is not meant to be limiting in any way. The power outputs are connected as required to elements of architecture 200 requiring power. In particular, hard drive 300 is connected to receive 5 V and 12 V outputs of power supply unit 280, and volatile memory 310 is connected to receive power from power supply unit 280 irrespective of the state of PS_ON#. It is to be understood that devices connected to the 5 VSTBY line are arranged to receive power from power supply unit 280 either from controller power supply 282 or from standby power supply 284 in the event of a shut down of controlled power supply 282 via the PS_ON# signal.

CPU and Chipset 290 are described herein as comprising a separate power management interface 295 however this is not meant to be limiting in any way, and is only intended as a functional description for clarity. In an exemplary embodiment power management interface 295 comprises the power management software functionality of the operating system running on CPU and Chipset 290. In a further exemplary embodiment the software functionality comprises ACPI. In an exemplary embodiment CPU and Chipset 290 comprises a super I/O chip operable to generate the PS_ON# signal.

In operation PoE splitter and LAN card 210 provides a data interface for architecture 200 and splits out power from the data communication cabling. PoE splitter and LAN card 210 further supplies an appropriate signature resistance, optional classification and isolation switch functionality, preferably in accordance with IEEE 802.3af. Optional MPS functionality 220 ensures that sufficient power is drawn over the PoE connection to ensure that power is not disconnected. In an exemplary embodiment optional MPS functionality 220 sinks at least 10 mA for a minimum duration of 75 ms followed by a dropout period of no more than 250 ms thus ensuring a valid DC MPS component in the event that the PSE monitors the DC MPS component in accordance with the IEEE 802.3af standard. In another embodiment the PSE monitors only the AC MPS component and optional MPS functionality 220 is not required. Boost converter 230 converts the received PoE electrical power which is at a nominal 48 volts to a voltage appropriate for the input of power supply unit 280. Storage capacitor 235 stores sufficient energy to support any momentary imbalance between the power supplied by PoE and the power required by architecture 200 as will be explained further hereinto below. PoE verification 240 outputs a logic high PoE Good signal only when the output of boost converter 230 is available and stable. Power selector 250 is operable to switchably connect the output of boost converter 230 to the input of power supply unit 280.

In an alternative embodiment (not shown) PoE splitter and LAN card 210 provides additional communication functionality with the PSE sourcing the PoE electrical power. In an exemplary embodiment, information is transmitted indicating that the PoE connection is for standby use, and thus optional MPS functionality 220 is not required. In response to the received transmitted information indicating that the PoE is for standby backup, switch 120 of FIG. 2a and midspan PSE 170 of FIG. 2b, respectively, enable PoE backup power irrespective of a valid DC MPS component. In another embodiment, responsive to the information received, an AC MPS component is exclusively monitored. Such communication capability is further described in pending U.S. patent application Ser. No. 10/961,108 filed Oct. 12, 2004 entitled "Powered Device Interface Circuit", the entire contents of which are incorporated herein by reference.

AC power received from AC mains connection 70 is filtered via EMI filter 260, rectified by diode bridge 270, smoothed by storage capacitor 275 and fed to power supply unit 280. After power has stabilized, power supply unit 280 outputs a plurality of voltages from controlled power supply 282 and standby power supply 284, and the DC Good signal responsive to controlled power supply 282. AC power is monitored by AC verification circuit 320 which functions to identify a loss of power. In an exemplary embodiment AC verification circuit 320 monitors the AC voltage waveform and outputs a logic high signal when AC power is good and a logic low signal when the AC waveform is absent or the form of the AC waveform is indicative of a loss of power. In an exemplary embodiment this is accomplished by sampling the incoming AC power voltage waveform, and comparing the sampled waveform with a pre-loaded standard waveform, thereby detecting any variation from the expected waveform. In one embodiment AC verification circuit 320 outputs a logic high signal within predetermined amount of time, preferably within 4 milliseconds or within ¼ of the cycle time, of the incoming AC power voltage waveform varying by more than 20% from the standard waveform. Inverter 330 inverts the output of AC verification circuit 320 prior to feeding it to the second input of AND gate 340. AND gate 340 outputs a logic high signal only in the event that the DC Good signal is at a logic high, AC verification circuit 320 indicates a loss of AC power and the output of boost converter 230 is available and stable as indicated by the PoE Good signal. It is to be noted that the DC Good signal exhibits a logic high either because the inherent hold up time of controlled power supply 282 maintains a DC Good signal even after AC verification circuit 320 has recognized a failure of AC mains power, or due to power being fed to power supply unit 280 from boost converter 230 via power selector 250.

A logic high output of AND gate 340 sets SR flip flop 360 and the Q output of SR flip flop 360 is fed to interrupt controller 370. The output of interrupt controller 370 is fed to CPU and Chipset 290 as an interrupt. In an exemplary embodiment, the interrupt is the system management interrupt (SMI). The Q output of SR flip flop 360 is further connected to the control input of power selector 250 as the Power Selector Control signal. Responsive to the Power Selector Control signal the output of boost converter 230 is fed to the input of power supply unit 280. In one embodiment power selector 250 comprises an ORing circuit and the voltage of boost converter 230 is pre-selected to be lower than the voltage across diode bridge 270 in the presence of AC power, and thus power selector 250 does not require the Power Selector signal as in input. As the voltage across diode bridge 270 declines, power is automatically fed from the lower voltage output of boost converter 230. In an exemplary embodiment, boost converter 230 comprises a large output storage capacitor 235, since the initial power requirements of power supply unit 280 are greater than the amount of power received via the PoE channel comprising PoE splitter and LAN card 210. This leads to a temporary power imbalance, which is supported by storage capacitor 235 until the imbalance is resolved as will be explained further hereinto below.

CPU and Chipset 290 responsive to the interrupt generated by interrupt controller 370 calls a routine which saves context information on volatile memory 310 and operates power management interface 295 to generate a logic high signal on PS_ON# thus shutting down the outputs of controlled power supply 282. Power is still supplied by standby power supply 284 to the 5 VSTBY output. The power requirements of power supply unit 280 responsive to a logic high signal on PS_ON# are less than the power available via the PoE channel. Thus, capacitor 235 of boost converter 230 supports the temporary power imbalance until the imbalance is corrected by the operation of the PS_ON# signal.

AND gate 350 outputs a logic high signal only in the event that the DC Good signal exhibits a logic high and the output of boost converter 230 is available and stable as indicated by a logic high POE Good signal. Such an input may be utilized by power management interface 295 to enable a user to set appropriate software settings responsive to the sensing of an available PoE based backup power.

Upon AC mains power being restored, AC verification circuit 320 senses available AC power and outputs a logic high signal resetting SR flip flop 360, which clears the input to interrupt controller 370 and responsive to the cleared input interrupt controller 370 clears the interrupt to CPU and Chipset 290 which is sensed by power management interface 295. Power management interface 295 responsive to the cleared interrupt and an appropriate delay set PS_ON# to a logic low. Controlled power supply 282 responsive to the logic low on PS_ON# and an AC mains input voltage within tolerance outputs DC voltages for the operation of CPU and Chipset 290 and other devices in architecture 200. In an alternative embodiment, CPU and Chipset 290 is responsive to a user pressing the power button to set PS_ON# to a logic low. Responsive to PS_ON# controlled power supply 282 enables all voltage outputs as required, and further sets the DC Good signal to a logic high. CPU and Chipset 290 responsive to the DC Good signal switching to a logic high and the previously cleared interrupt restores the context information and enables normal operation exiting the interrupt routine.

Preferably, upon restore the computer begins to function without requiring a reboot. Such a quick restart is enabled by the storing of status information.

In one embodiment, a power backup module comprising PoE splitter and LAN card 210, boost converter 230, PoE verification 240, power selector 250 and AC verification circuit 320 may be supplied. Such a power backup module advantageously may be added to an existing computer, or designed as a separately available power backup module for original equipment.

FIG. 4a is a timing diagram showing the relationship between certain signals in architecture 200 of FIG. 3a with the x-axis reflecting time. No attempt has been made to draw the timing diagrams to scale, and thus no meaning is to be imparted by the distances between events depicted. At time T1, PoE has been received and detected as stable by the operation of POE verification 240, and the PoE Good signal exhibits a logic high. At time T2, AC mains power has been received and is within the pre-determined range and the output of AC verification circuit 320 exhibits a logic high. At time T3, which in an exemplary embodiment may occur after the power button has been pushed by a user, the DC Good signal exhibits a logic high indicating stable power from controlled power supply 282 is available. The Power Selector Control signal exhibits a logic low responsive to the logic high signal at the Reset input of SR flip flop 360. PS_ON#, which is an active low signal, exhibits a logic low during this period under control of power management interface 295 thus enabling controlled power supply 282 and powering all connected device from AC mains power.

At time T4 the output of AC verification circuit 320 exhibits a logic low, indicating that AC power is outside of a pre-determined range. It is to be understood by those skilled in the art that in prior art systems the DC Good signal would exhibit a logic low after expiration of the hold up time of controlled power supply 282 from the loss of AC power. The logic low output of AC verification circuit 320 sets the Q output of SR flip flop 360 to a logic high, the Q output of SR flip flop 260 being labeled the Power Selector Control signal and further being the input to interrupt controller 370. As indicated above, a logic high Power Selector Control signal enables powering of power supply unit 280 from power received via PoE, and generates an interrupt to CPU and Chipset 290. At time T5, CPU and Chipset 290 has completed storing the context information on volatile memory 310 which will receive backup power during AC mains failure from boost converter 230. Power management interface 295 sets PS_ON# to a logic high thereby powering down all outputs of controlled power supply unit 282. In one embodiment, power management interface 295 further turns off devices, setting them to a sleep or hibernate mode just prior to setting PS_ON# to a logic high. In an exemplary embodiment the thermal (CPU) fan is turned off. Setting PS_ON# to a logic high reduces power demand of architecture 200 to be less than or equal to the amount available via the PoE channel through boost converter 230. At time T6, responsive to the PS_ON# signal being set to a logic high, the DC Good signal goes to a logic low indicating that DC power from controlled power supply 282 is no longer available, and only power from standby power supply 284 is available.

It is to be understood that architecture 200 sets an interrupt to CPU and Chipset 290 when the DC Good signal exhibits a logic high, the AC verification signal exhibits a logic low and the PoE Good signal exhibits a logic high. Thus, the interrupt reflects that controlled power supply unit 282 presents a valid output, backup power is available and AC verification 320 has sensed that AC mains power is out of the pre-determined range. The interrupt ends when AC verification 320 indicates that the AC mains power is within the pre-determined range as shown at time T7. The Power Selector Control signal goes to a logic low, ending the interrupt to CPU and Chipset 290, and disconnecting the output of boost converter 230 from the input of power supply unit 280. Preferably, the disconnection is accomplished after a delay allowing for the build up of AC power to the input of power supply unit 280 prior to the disconnection of the output of boost converter 230. In the embodiment in which power selector 250 is embodied in an ORing circuit such as a diode sharing arrangement, this is an automatic consequence of valid AC power appearing across the input of power supply unit 280. At time T8 power supply unit 280 supplies regulated DC voltages as required, and CPU and Chipset 290 responsive to the interrupt end, restores context information and continues operation in a manner that will be explained further hereinto below.

Figure 3B:
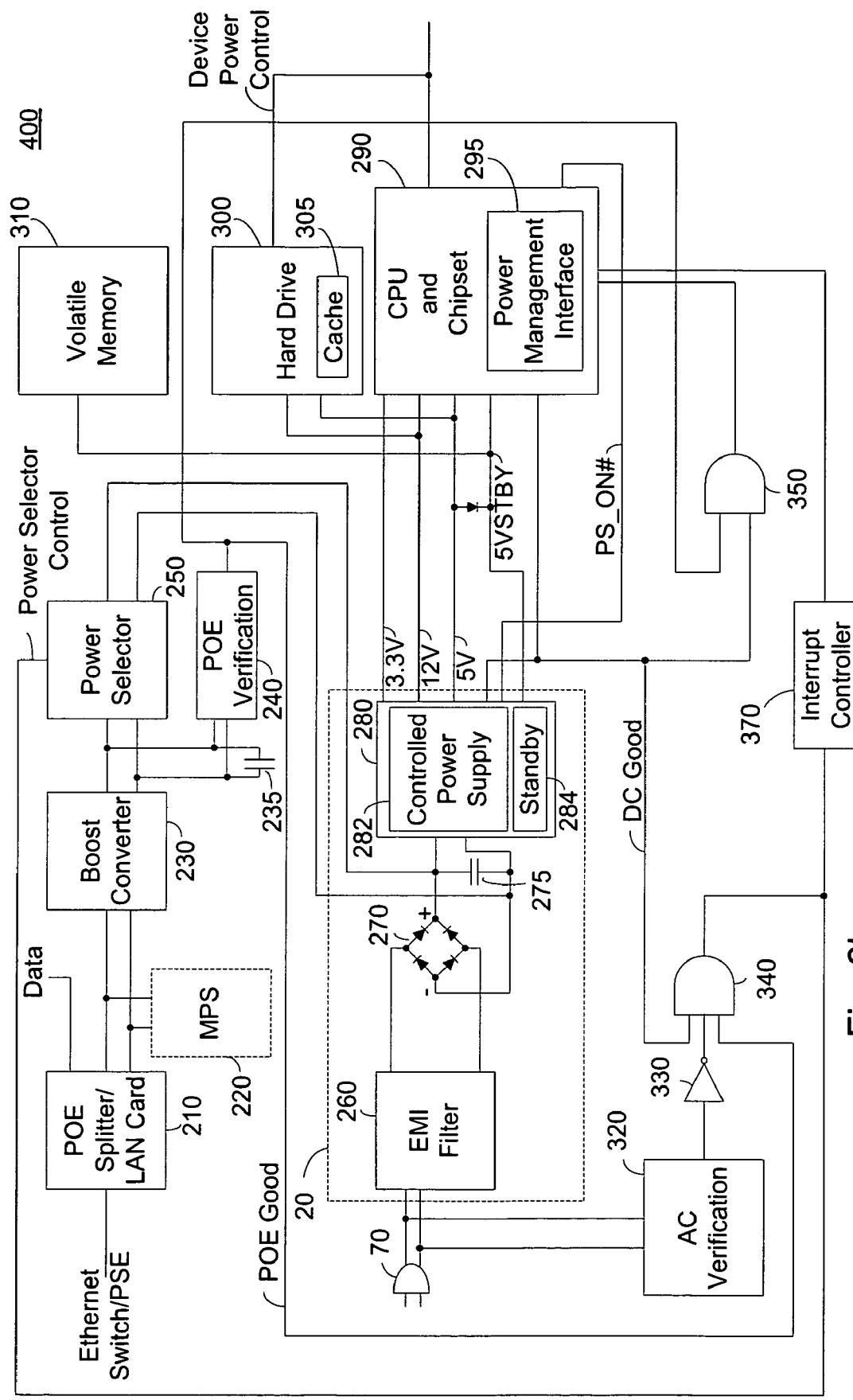
FIG. 3b is a high level block diagram of a second embodiment of an architecture for supplying backup power via power over Ethernet in accordance with the principle of the current invention.

FIG. 3b is a high level block diagram of a second embodiment of an architecture for a computer, denoted architecture 400, providing backup power via PoE in accordance with the principle of the current invention. Architecture 400 comprises: PoE splitter and LAN card 210; optional maintain power signature (MPS) functionality 220; boost converter 230; storage capacitor 235; PoE verification 240; power selector 250; AC mains connection 70, power supply 20 comprising EMI filter 260, diode bridge 270, storage capacitor 275 and power supply unit 280 comprising controlled power supply 282 and standby power supply 284; CPU and Chipset 290 comprising power management interface 295; hard drive 300 comprising cache memory 305; volatile memory 310; AC verification circuit 320; inverter 330; AND gate 340; AND gate 350; and interrupt controller 370.

PoE splitter and LAN card 210 is connected over data communication cabling to an Ethernet switch for data communications supplying PoE such as switch 120 of FIG. 2a, or to switch 160 supplying data communications and midspan PSE 170 supplying PoE of FIG. 2b. PoE splitter and LAN card 210 is described herein as a single card, however this is not meant to be limiting in any way. The PoE splitting functionality as described in the above reference IEEE 802.3af standard may be separate from the LAN card functionality without exceeding the scope of the invention. Furthermore LAN card functionality need not be supplied and PoE may be delivered over wire pairs not actively carrying data without exceeding the scope of the invention.

One connection of PoE splitter and LAN card 210 is connected to a data connection as is known to those skilled in the art, which in an exemplary embodiment comprises a physical layer connection known as a PHY. The power output of PoE splitter and LAN card 210 is connected to boost converter 230 and in parallel to optional MPS functionality 220. In an exemplary embodiment optional MPS functionality 220 is integrated within boost converter 230. The output of boost converter 230 is connected to power selector 250 and in parallel to PoE verification 240 and storage capacitor 235. The output of power selector 250 is connected to the input of power supply unit 280. The output of PoE verification 240, denoted "PoE Good" is connected to a first input of AND gate 340 and to a first input of AND gate 350.

AC mains connection 70 is connected to EMI filter 260 at the input of power supply 20 and in parallel to AC verification circuit 320. The output of EMI filter 260 is connected to the input of diode bridge 270 and the rectified output of diode bridge 270 is connected across storage capacitor 275 to the input of power supply unit 280. The output of AC verification circuit 320 is connected via inverter 330 to a second input of AND gate 340. An output of power supply unit 280 denoted "DC Good" is connected to a third input of AND gate 340, to a second input of AND gate 350 and to input of CPU and Chipset 290. The output of AND gate 340, denoted "Power Selector Control" is fed to the input of interrupt controller 370 and is further fed to the control input of power selector 250. The output of interrupt controller 370 is fed to an input of CPU and Chipset 290 and the output of AND gate 350 is fed to a separate input of CPU and Chipset 290. An output of CPU and Chipset 290 denoted "Device Power Control" is fed to power control inputs of all connected devices (not shown) including hard drive 300. An output of CPU and Chipset 290 denoted "PS_ON#" is connected to the remote powering control input of power supply unit 280. Power outputs denoted 3.3 V, 12 V, 5 V and 5 VSTBY of power supply unit 280 are shown connected to CPU and Chipset 290 however this is not meant to be limiting in any way. The power outputs are connected as required to elements of architecture 400 requiring power. In particular, hard drive 300 is connected to receive 5 V and 12 V outputs of controlled power supply unit 282, and volatile memory 310 is connected to receive power from power supply unit 280 irrespective of the state of the PS_ON# signal. It is to be understood that devices connected to the 5 VSTBY line are arranged to receive power from power supply unit 280 either from controller power supply 282 or from standby power supply 284 in the event of a shut down of controlled power supply 282 via the PS_ON# signal.

CPU and Chipset 290 are described herein as comprising a separate power management interface 295 however this is not meant to be limiting in any way, and is only intended as a functional description for clarity. In an exemplary embodiment power management interface 295 comprises the power management software functionality of the operating system running on CPU and Chipset 290. In a further exemplary embodiment the software functionality comprises ACPI. In an exemplary embodiment CPU and Chipset 290 comprises a super I/O chip operable to generate the PS_ON# signal.

In operation PoE splitter and LAN card 210 provides a data interface for architecture 400 and splits out power from the data communication cabling. PoE splitter and LAN card 210 further supplies an appropriate signature resistance, optional classification and isolation switch functionality, preferably in accordance with IEEE 802.3af. Optional MPS functionality 220 ensures that sufficient power is drawn over the PoE connection to ensure that power is not disconnected. In an exemplary embodiment optional MPS functionality 220 sinks at least 10 mA for a minimum duration of 75 ms followed by a dropout period of no more than 250 ms thus ensuring a valid DC MPS component in the event that the PSE monitors the DC MPS component in accordance with the IEEE 802.3af standard. In another embodiment the PSE monitors only the AC MPS component and optional MPS functionality 220 is not required. Boost converter 230 converts the received PoE electrical power which is at a nominal 48 volts to a voltage appropriate for the input of power supply unit 280. Storage capacitor 235 stores sufficient energy to support any momentary imbalance between the power supplied by PoE and the power required by architecture 400 as will be explained further hereinto below. PoE verification 240 outputs a logic high PoE Good signal only when the output of boost converter 230 is available and stable. Power selector 250 is operable to switchably connect the output of boost converter 230 to the input of power supply unit 280.

In an alternative embodiment (not shown) PoE splitter and LAN card 210 provides additional communication functionality with the PSE sourcing the PoE electrical power. In an exemplary embodiment, information is transmitted indicating that the PoE connection is for standby use, and thus optional MPS functionality 220 is not required. In response to the received transmitted information indicating that the PoE is for standby backup, switch 120 of FIG. 2a and midspan PSE 170 of FIG. 2b, respectively, enable PoE backup power irrespective of a valid DC MPS component. In another embodiment, responsive to the information received, an AC MPS component is exclusively monitored. Such communication capability is further described in previously referenced pending U.S. patent application Ser. No. 10/961,108 filed Oct. 12, 2004 entitled "Powered Device Interface Circuit".

AC power received from AC mains connection 70 is filtered via EMI filter 260, rectified by diode bridge 270, smoothed by storage capacitor 275 and fed to power supply unit 280. After power has stabilized, power supply unit 280 outputs a plurality of voltages from controlled power supply 282 and standby power supply 284, and the DC Good signal responsive to controlled power supply 282. Controlled power supply 282 outputs voltages only in response to a logic low input on PS_ON# which may be generated by a user pressing a power on switch (not shown). AC power is monitored by AC verification circuit 320 which functions to identify a loss of power. In an exemplary embodiment AC verification circuit 320 monitors the AC voltage waveform and outputs a logic high signal when AC power is good and a logic low signal when the AC waveform is absent or the form of the AC waveform is indicative of a loss of power. In an exemplary embodiment this is accomplished by sampling the incoming AC power voltage waveform, and comparing the sampled waveform with a pre-loaded standard waveform, thereby detecting any variation from the expected waveform. In one embodiment AC verification circuit 320 outputs a logic high signal within predetermined amount of time, preferably within 4 milliseconds or within ¼ of the cycle time, of the incoming AC power voltage waveform varying by more than 20% from the standard waveform. Inverter 330 inverts the output of AC verification circuit 320 prior to feeding it to the second input of AND gate 340. AND gate 340 outputs a logic high signal only in the event that the DC Good signal is present, AC verification circuit 330 indicates a loss of AC power and the output of boost converter 230 is available and stable as indicated by the PoE Good signal exhibiting a logic high. It is to be noted that the DC Good signal may exhibit a logic high either because the inherent hold up time of controlled power supply 282 maintains a DC Good signal even after AC verification circuit 320 has recognized a failure of AC mains power, or due to power being fed to power supply unit 280 from boost converter 230 via power selector 250.

The logic high output of AND gate 340 is fed to interrupt controller 370 which interprets the rising edge or the logic high level of the output of AND gate 340 as an interrupt event.

The output of interrupt controller 370 is fed to CPU and Chipset 290 as an interrupt. In an exemplary embodiment, the interrupt is the system management interrupt (SMI). The output of AND gate 340 is further connected to the control input of power selector 250 as the Power Selector Control signal. Responsive to the Power Selector Control signal the output of boost converter 230 is fed to the input of power supply unit 280. In one embodiment power selector 250 comprises an ORing circuit and the voltage of boost converter 230 is pre-selected to be lower than the voltage across diode bridge 270 in the presence of AC power, and thus power selector 250 does not require the Power Selector signal as in input. As the voltage across diode bridge 270 declines, power is automatically fed from the lower voltage output of boost converter 230. In an exemplary embodiment, boost converter 230 comprises a large output storage capacitor 235, since the initial power requirements of power supply unit 280 are greater than the amount of power received via the PoE channel comprising PoE splitter and LAN card 210. This leads to a temporary power imbalance, which is supported by storage capacitor 235 until the imbalance is resolved as will be explained further hereinto below.

CPU and Chipset 290 responsive to the interrupt generated by interrupt controller 370 calls a routine which saves context information on volatile memory 310 and then, via power management interface 295, operates the device power control signal to place each of the connected devices in a reduced power mode. Preferably, the reduced power mode is a sleep mode in which device context is saved. In the event that a device context is stored by CPU and Chipset 290 on volatile memory 310 the device may be put into an off state to save additional power. The power requirements of architecture 400 responsive to each of the connected devices being placed in the above reduced power mode is less than or equal to the power available via the PoE channel. The operation of power management interface 295 to reduce the power demand of all connected devices takes some finite period of time, and capacitor 235 of boost converter 230 provides the required electrical energy for the temporary power imbalance until the imbalance is corrected by the successful reduction of power demand of the connected devices. It is to be understood that CPU and Chipset 290 is responsive to power management interface 295 to move to a standby low power mode. It is to be noted that in the above embodiment the DC Good signal remains positive, as power supply unit 280 receives input power either from AC mains or from boost converter 230 in the event of an AC failure. In an exemplary embodiment controlled power supply 282 is not commanded to power down.

AND gate 350 outputs a logic high signal only in the event that the DC Good signal exhibits a logic high and the output of boost converter 230 is available and stable as indicated by a logic high POE Good signal. Such an input may be utilized by power management interface 295 to enable a user to set appropriate software settings responsive to the sensing of an available PoE based back up power.

Upon AC mains power being restored, AC verification circuit 320 senses available AC power and outputs a logic high signal which is inverted by inverter 330 thus changing the output of AND gate 340 to a logic low clearing the input to interrupt controller 370. Responsive to the cleared input interrupt controller 370 clears the interrupt to CPU and Chipset 290 which is sensed by power management interface 295. Power management interface 295 responsive to the cleared interrupt and an appropriate delay to allow for the restarting of controlled power supply 282 restores the context information and enables normal operation exiting the interrupt routine. In an exemplary embodiment power management interface 295 confirms that PS_ON# is set to a logic low prior to enabling normal operation. Advantageously, normal operation continues without requiring computer reboot.

In one embodiment, a power backup module comprising PoE splitter and LAN card 210, boost converter 230, PoE verification 240, power selector 250 and AC verification circuit 320 may be supplied. Such a power backup module advantageously may be added to an existing computer, or designed as a separately available power backup module for original equipment.

FIG. 4b is a timing diagram showing the relationship between certain signals in architecture 400 of FIG. 3b with the x-axis reflecting time. No attempt has been made to draw the timing diagrams to scale, and thus no meaning is to be imparted by the distances between events depicted. At time T11, PoE has been received and detected as stable by the operation of POE verification 240, and the PoE Good signal exhibits a logic high. At time T12, AC mains power has been received and is within the pre-determined range and the output of AC verification circuit 320 exhibits a logic high. At time T13, which in an exemplary embodiment may occur after the power button has been pushed by a user, the DC Good signal exhibits a logic high indicating stable power from controlled power supply 282 is available. The Power Selector Control signal exhibits a logic low responsive to the logic high output of AC verification circuit 320.

At time T14 the output of AC verification circuit 320 exhibits a logic low, indicating that AC power is outside of a pre-determined range. It is to be understood by those skilled in the art that in prior art systems the DC Good signal would exhibit a logic low after expiration of the hold up time of power supply 20 and in particular controlled power supply 282 after the loss of AC power. The logic low output of AC verification circuit 320 is inverted by inverter 330 and fed via AND gate 340 as a logic high input to interrupt controller 370. As indicated above, a logic high Power Selector Control signal enables powering of power supply unit 280 from power received via PoE, and generates an interrupt to CPU and Chipset 290. At time T15, CPU and Chipset 290 has completed storing the context information on volatile memory 310 that will receive power from boost converter 230 and via power management interface 295 and associated Device Power Control signals begins to reduce total power demand. At time T16 total power demand has been reduced to equal to or less than the power available from the PoE channel via boost converter 230. In one embodiment CPU and Chipset 290 stores all context information on volatile memory 310 and in another embodiment all devices are placed in their minimum power state while maintaining context. Cache 305 of hard drive 300 remains in a low power state, and receives power from power supply unit 280. In another embodiment, power management interface 295 further turns off devices, setting them to a sleep or hibernate mode. In an exemplary embodiment at time T16 the thermal (CPU) fan has been turned off.

It is to be understood that architecture 400 sets an interrupt to CPU and Chipset 290 when the DC Good signal exhibits a logic high, the AC verification signal exhibits a logic low and the PoE Good signal exhibits a logic high. Thus the interrupt reflects that controlled power supply unit 282 presents a valid output, backup power is available and AC verification 320 has sensed that AC mains power is out of the pre-determined range. The interrupt ends when AC verification 320 indicates that the AC mains power is within the pre-determined range as shown at time T17. The Power Selector Control signal changes to a logic low, ending the interrupt to CPU and Chipset 290, and disconnecting the output of boost converter 230 from the input of power supply unit 280. Preferably, the disconnection is accomplished after a delay allowing for the build up of AC power to the input of power supply unit 280 prior to the disconnection of the output of boost converter 230. In the embodiment in which power selector 250 is embodied in an ORing circuit such as a diode sharing arrangement, this is an automatic consequence of valid AC power appearing across the input of power supply unit 280. CPU and Chipset 290 responsive to the interrupt end, after an appropriate delay allowing for the build up of power from AC mains connection 70, restores context information and continues operation in a manner that will be explained further hereinto below. Advantageously, CPU and Chipset 290 continue operation without requiring reboot.

Figure 3C:
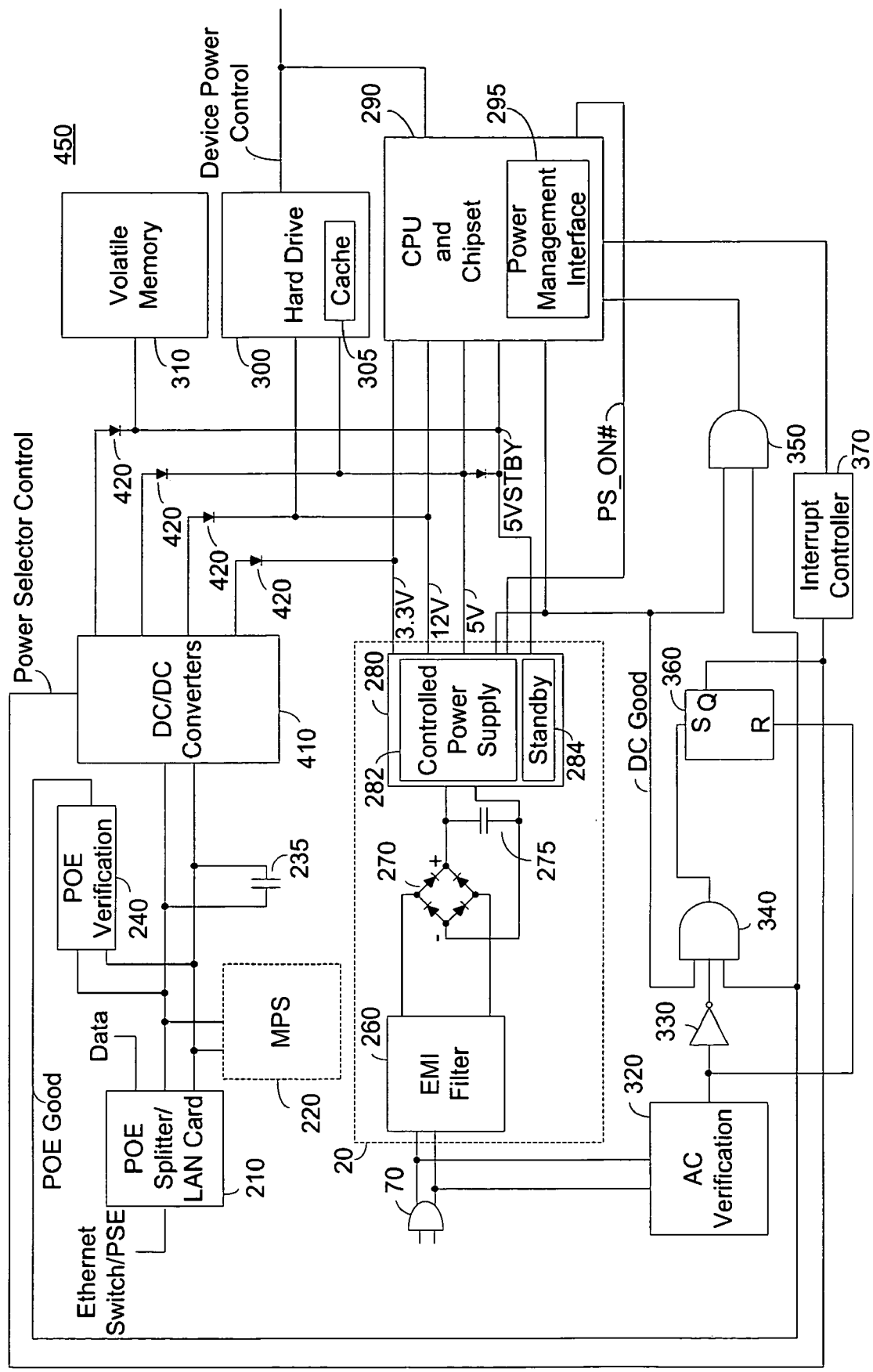
FIG. 3c is a high level block diagram of a third embodiment of an architecture for supplying backup power via power over Ethernet in accordance with the principle of the current invention.

FIG. 3c is a high level block diagram of a third embodiment of an architecture for a computer, denoted architecture 450, providing backup power via PoE in accordance with the principle of the current invention. Architecture 450 comprises: PoE splitter and LAN card 210; optional maintain power signature (MPS) functionality 220; storage capacitor 235; PoE verification 240; DC/DC converters 410; ORing circuits 420; AC mains connection 70; power supply 20 comprising EMI filter 260, diode bridge 270, storage capacitor 275 and power supply unit 280 comprising controlled power supply 282 and standby power supply 284; CPU and Chipset 290 comprising power management interface 295; hard drive 300 comprising cache memory 305; volatile memory 310; AC verification circuit 320; inverter 330; AND gate 340; AND gate 350; SR flip flop 360; and interrupt controller 370.

PoE splitter and LAN card 210 is connected over data communication cabling to an Ethernet switch for data communications supplying PoE such as switch 120 of FIG. 2a, or to switch 160 supplying data communications and midspan PSE 170 supplying PoE of FIG. 2b. PoE splitter and LAN card 210 is described herein as a single card, however this is not meant to be limiting in any way. The PoE splitting functionality as described in the above reference IEEE 802.3af standard may be separate from the LAN card functionality without exceeding the scope of the invention. Furthermore LAN card functionality need not be supplied and PoE may be delivered over wire pairs not actively carrying data without exceeding the scope of the invention.

One connection of PoE splitter and LAN card 210 is connected to a data connection as is known to those skilled in the art, which in an exemplary embodiment comprises a physical layer connection known as a PHY. The power output of PoE splitter and LAN card 210 is connected to the input of DC/DC converters 410 and in parallel to optional MPS functionality 220, POE verification 240, and storage capacitor 235. Optional MPS functionality 220 is in an exemplary embodiment integrated within DC/DC converters 410. The outputs of DC/DC converters 410 are connected via respective ORing circuits 420, depicted herein as ORing diodes, to each voltage output of power supply unit 280 which is to be backed up as will be described further. The output of PoE verification 240, denoted "PoE Good" is connected to a first input of AND gate 340 and to a first input of AND gate 350.

AC mains connection 70 is connected to EMI filter 260 at the input of power supply 20 and in parallel to AC verification circuit 320. The output of EMI filter 260 is connected to the input of diode bridge 270 and the rectified output of diode bridge 270 is connected across storage capacitor 275 to the input of power supply unit 280. The output of AC verification circuit 320 is connected via inverter 330 to a second input of AND gate 340. An output of power supply unit 280 denoted "DC Good" is connected to a third input of AND gate 340, to a second input of AND gate 350 and to an input of CPU and Chipset 290. The output of AND gate 340 is connected to the set input of SR flip flop 360, and the Q output of SR flip flop 360, denoted "Power Selector Control" is connected to the input of interrupt controller 370 and in parallel to the control input of DC/DC converters 410. The output of interrupt controller 370 is fed to an input of CPU and Chipset 290 and the output AND gate 350 is fed to a separate input of CPU and Chipset 290. An output of CPU and Chipset 290 denoted "Device Power Control" is fed to power control inputs of all connected devices (not shown) including hard drive 300. An output of CPU and Chipset 290 denoted "PS_ON#", is connected to the remote powering control input of power supply unit 280. Power outputs denoted 3.3 V, 12 V, 5 V and 5 VSTBY of power supply unit 280 are shown connected to CPU and Chipset 290 however this is not meant to be limiting in any way. The power outputs are connected as required to elements of architecture 450 requiring power. In particular, hard drive 300 is connected to receive 5 V and 12 V outputs of controlled power supply unit 282, and volatile memory 310 is connected to receive power from power supply unit 280 irrespective of the state of the PS_ON# signal in one embodiment from standby power supply 284. It is to be understood that devices connected to the 5 VSTBY line are arranged to receive power from power supply unit 280 either from controller power supply 282 or from standby power supply 284 in the event of a shut down of controlled power supply 282 via the PS_ON# signal.

CPU and Chipset 290 are described herein as comprising a separate power management interface 295 however this is not meant to be limiting in any way, and is only intended as a functional description for clarity. In an exemplary embodiment power management interface 295 comprises the power management software functionality of the operating system running on CPU and Chipset 290. In a further exemplary embodiment the software functionality comprises ACPI. In an exemplary embodiment CPU and Chipset 290 comprises a super I/O chip operable to generate the PS_ON# signal.

In operation PoE splitter and LAN card 210 provides a data interface for architecture 450 and splits out power from the data communication cabling. PoE splitter and LAN card 210 further supplies an appropriate signature resistance, optional classification and isolation switch functionality, preferably in accordance with IEEE 802.3af. Optional MPS functionality 220 ensures that sufficient power is drawn over the PoE connection to ensure that power is not disconnected. In an exemplary embodiment optional MPS functionality 220 sinks at least 10 mA for a minimum duration of 75 ms followed by a dropout period of no more than 250 ms thus ensuring a valid DC MPS component in the event that the PSE monitors the DC MPS component in accordance with the IEEE 802.3af standard. In another embodiment the PSE monitors only the AC MPS component and optional MPS functionality 220 is not required. In practice, DC/DC converters 410 may be designed to comprise MPS functionality 220 and thus a separate MPS functionality is not required. DC/DC converters 410 convert the received PoE electrical power which is at a nominal 48 volts to voltages appropriate for each of the voltage outputs of power supply unit 280 to be backed up. Storage capacitor 235 stores sufficient energy to support any momentary imbalance between the power supplied by PoE and the power required by architecture 450 as will be explained further hereinto below. PoE verification 240 outputs a logic high PoE Good signal when the PoE power input to DC/DC converters 410 is available and stable. The Power Selector Control signal is operable to turn on DC/DC converters 410 to full output. In an exemplary embodiment the power selector control signal is not used as an input to DC/DC converters 410, and DC/DC converters 410 act responsive to an increased power draw via ORing circuits 420 to increase their power output.

In an alternative embodiment (not shown) PoE splitter and LAN card 210 provides additional communication functionality with the PSE sourcing the PoE electrical power. In an exemplary embodiment, information is transmitted indicating that the PoE connection is for standby use, and thus optional MPS functionality 220 is not required. In response to the received transmitted information indicating that the PoE is for standby backup, switch 120 of FIG. 2*a* and midspan PSE 170 of FIG. 2*b*, respectively, enable PoE backup power irrespective of a valid DC MPS component. In another embodiment, responsive to the information received, an AC MPS component is exclusively monitored. Such communication capability is further described in previously referenced pending U.S. patent application Ser. No. 10/961,108 filed Oct. 12, 2004 entitled "Powered Device Interface Circuit".

AC power received from AC mains connection 70 is filtered via EMI filter 260, rectified by diode bridge 270, smoothed by storage capacitor 275 and fed to power supply unit 280. After power has stabilized, power supply unit 280 outputs a plurality of voltages from controlled power supply 282 and standby power supply 284, and the DC Good signal responsive to controlled power supply 282. Controlled power supply 282 outputs voltages only in response to a logic low input on PS_ON# which may be generated by a user pressing a power on switch (not shown). AC power is monitored by AC verification circuit 320 which functions to identify a loss of power. In an exemplary embodiment AC verification circuit 320 monitors the AC voltage waveform and outputs a logic high signal when AC power is good and a logic low signal when the AC waveform is absent or the form of the AC waveform is indicative of a loss of power. In an exemplary embodiment this is accomplished by sampling the incoming AC power voltage waveform, and comparing the sampled waveform with a pre-loaded standard waveform, thereby detecting any variation from the expected waveform. In one embodiment AC verification circuit 320 outputs a logic high signal within predetermined amount of time, preferably within 4 milliseconds or within ¼ of the cycle time, of the incoming AC power voltage waveform varying by more than 20% from the standard waveform. Inverter 330 inverts the output of AC verification circuit 320 prior to connecting the inverted output to the second input of AND gate 340. AND gate 340 outputs a logic high signal only in the event that the DC Good signal is present, AC verification circuit 330 indicates a loss of AC power and PoE is available to support the operation of DC/DC converters 410 as indicated by the PoE Good signal exhibiting a logic high. It is to be noted that the DC Good signal may exhibit a logic high after the failure of incoming AC power because the inherent hold up time of power supply 20 and in particular controlled power supply 282 maintains a DC Good signal even after AC verification circuit 320 has recognized a failure of AC mains power.

The logic high output of AND gate 340 sets SR flip flop 360 so that the Q output of SR flip flop 360 becomes logic high. The Q output of SR flip flop 360 is fed to interrupt controller 370 which interprets the rising edge or the logic high level of the Q output as an interrupt event. The output of interrupt controller 370 is fed to CPU and Chipset 290 as an interrupt. In an exemplary embodiment, the interrupt is the system management interrupt (SMI). The Q output of SR flip flop 360 is further connected to the control input of DC/DC converters 410 as the Power Selector Control signal. In one embodiment responsive to the logic high Power Selector Control signal DC/DC converters 410 are set to supply full power. In another embodiment DC/DC converters 410 are set to a slightly higher voltage than the nominal outputs of power supply unit 280 and thus automatically supply power via ORing circuits 420 when the outputs of power supply unit 280 decline and thus DC/DC converters 410 do not require the Power Selector Control signal as an input. In an exemplary embodiment, storage capacitor 235 is of a relatively large value to handle any temporary power imbalance between the power demand of devices in architecture 450 and the power available from the PoE channel comprising PoE splitter/LAN card 210.

CPU and Chipset 290 responsive to the interrupt generated by interrupt controller 370 calls a routine which stores context information on volatile memory 310 and then, via power management interface 295, operates the Device Power Control signal to place each of the connected devices in a reduced power mode. Preferably, the reduced power mode is a sleep mode in which device context is saved. In the event that a device context is stored by CPU and Chipset 290 on volatile memory 310 the device may be put into an off state to save additional power. The power requirements of architecture 450 responsive to each of the connected devices being placed in the above reduced power mode is less than or equal to the power available via the PoE channel. The operation of power management interface 295 to reduce the power demand of all connected devices takes some finite period of time, and capacitor 235 supports the temporary power imbalance until the imbalance is corrected by the successful reduction of power demand of the connected devices. It is to be understood that CPU and Chipset 290 is responsive to power management interface 295 to move to a standby low power mode. It is to be noted that in the above embodiment power supply unit 280 ceases operation after failure of the AC mains input, and the DC Good signal becomes a logic low.

AND gate 350 outputs a logic high signal only in the event that the DC Good signal exhibits a logic high and the output of DC/DC converters 410 is available and stable as indicated by a logic high POE Good signal. Such an input may be utilized by power management interface 295 to enable a user to set appropriate software settings responsive to the sensing of an available PoE based back up power.

Upon AC mains power being restored, AC verification circuit 320 senses available AC power and outputs a logic high signal which is inverted by inverter 330 thus changing the output of AND gate 340 to a logic low clearing the input to interrupt controller 370. Responsive to the cleared input interrupt controller 370 clears the interrupt to CPU and Chipset 290 which is sensed by power management interface 295. Power management interface 295 responsive to the cleared interrupt and an appropriate delay sets the PS_ON# signal to enable controlled power supply 282 and responsive to a received logic high DC Good signal restores the context information and enables normal operation exiting the interrupt routine. In another embodiment, a user input such as the pushing of the power on button (not shown) is required to restart controlled power supply 282. Advantageously, CPU and Chipset 290 continue operation without requiring reboot.

FIG. 4*c* is a timing diagram showing the relationship between certain signals in architecture 450 of FIG. 3*c* with the x-axis reflecting time. No attempt has been made to draw the timing diagrams to scale, and thus no meaning is to be imparted by the distances between events depicted. At time T21, PoE has been received and detected as stable by the operation of POE verification 240, and the PoE Good signal exhibits a logic high. At time T22, AC mains power has been received and is within the pre-determined range and the output of AC verification circuit 320 exhibits a logic high. At time T23, which in an exemplary embodiment may occur after the power button has been pushed by a user, the DC Good signal becomes positive indicating stable power from controlled power supply 282 is available. The Power Selector Control signal exhibits a logic low responsive to the logic high output of AC verification circuit 320.

At time T24 the output of AC verification circuit 320 exhibits a logic low, indicating that AC power is outside of a pre-determined range. It is to be understood by those skilled in the art that in prior art systems the DC Good signal would become negative after expiration of the hold up time of power supply 20, and in particular controlled power supply 282, after the loss of AC power. The logic low output of AC verification circuit 320 is inverted by inverter 330 and fed via AND gate 340 to set SR flip flop 360 whose Q output is fed as a logic high input to interrupt controller 370, which then generates an interrupt to CPU and Chipset 290. At time T25, CPU and Chipset 290 has completed storing the context information on volatile memory 310 that will receive power from DC/DC converters 310 and power management interface 295 via the associated Device Power Control signals begins to reduce total power demand. In another embodiment at time T25, CPU and Chipset 290 and in particular power management interface 295 has begun the processes of reducing power demand by placing devices into a standby mode. At time T26 the hold up time of power supply 20, and in particular controlled power supply 282, has expired and the DC Good signal exhibits a logic low. It is to be noted that at this time power is being supplied by DC/DC converters 410, with any temporary power demand in excess of that available from the PoE channel being supplied from storage capacitor 235.

At time T27 total power demand has been reduced to equal to or less than the power available from the PoE connection or channel via PoE splitter and LAN card 210. In one embodiment CPU and Chipset 290 stores all context information on volatile memory 310 and in another embodiment all devices are placed in their minimum power state while maintaining context. Cache 305 of hard drive 300 remains in a low power state, and receives power from DC/DC converters 410 via ORing circuits 420. In another embodiment, power management interface 295 further turns off devices, setting them to a sleep or hibernate mode. In an exemplary embodiment at time T27 the thermal (CPU) fan has been turned off.

It is to be understood that architecture 450 sets an interrupt to CPU and Chipset 290 when the DC Good signal exhibits a logic high, the AC verification signal exhibits a logic low and the PoE Good signal exhibits a logic high. Thus the interrupt reflects that controlled power supply unit 282 presents a valid output, backup power is available and AC verification 320 has sensed that AC mains power is out of the pre-determined range. The interrupt ends when AC verification 320 indicates that the AC mains power is within the pre-determined range, thus resetting SR flip flop 360, as shown at time T28. The Power Selector Control signal changes to exhibit a logic low, ending the interrupt to CPU and Chipset 290, and in one embodiment reducing the output of DC/DC converters 410. Preferably, the reduction is accomplished after a delay allowing for the build up of AC power to the input of power supply unit 280 prior to the reduction of output of DC/DC converters 410. In another embodiment the output of DC/DC converters 410 connected via ORing circuits 420 to the respective outputs of power supply unit 280 reduce their outputs responsive to the reappearance of nominal outputs from power supply unit 280. CPU and Chipset 290, responsive to the interrupt end, after an appropriate delay allowing for the build up of power from AC mains connection 70, restores context information and continues operation in a manner that will be explained further hereinto below.

Figure 3D:
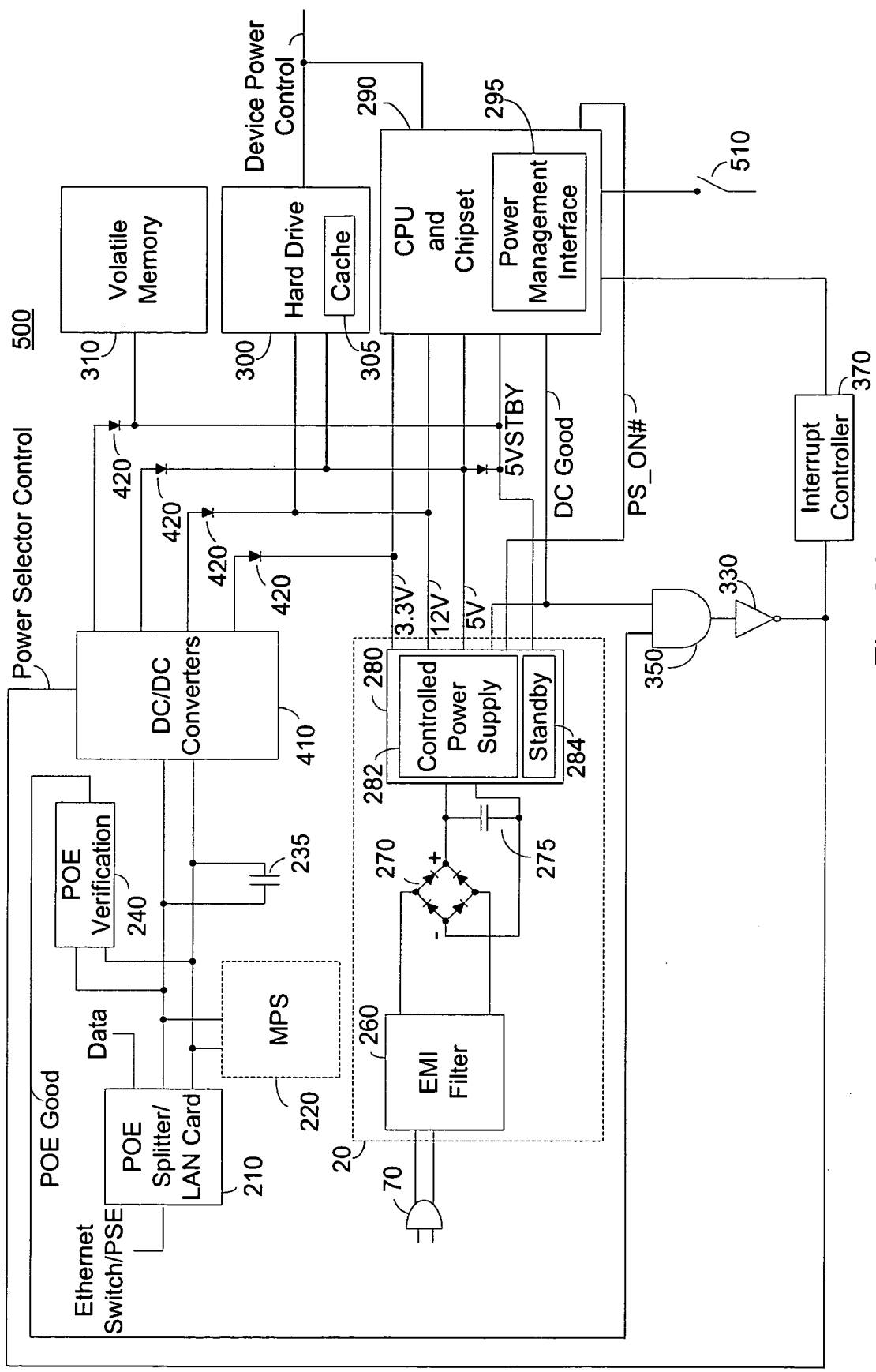
FIG. 3d is a high level block diagram of a fourth embodiment of an architecture for supplying backup power via power over Ethernet in accordance with the principle of the current invention.

FIG. 3d is a high level block diagram of a fourth embodiment of an architecture for a computer, denoted architecture 500, providing backup power via PoE in accordance with the principle of the current invention. Architecture 500 comprises: PoE splitter and LAN card 210; optional maintain power signature (MPS) functionality 220; storage capacitor 235; PoE verification 240; DC/DC converters 410; ORing circuits 420; AC mains connection 70; power supply 20 comprising EMI filter 260, diode bridge 270, storage capacitor 275 and power supply unit 280 comprising controlled power supply 282 and standby power supply 284; CPU and Chipset 290 comprising power management interface 295; hard drive 300 comprising cache memory 305; volatile memory 310; inverter 330; AND gate 350; interrupt controller 370; and power push button 510.

PoE splitter and LAN card 210 is connected over data communication cabling to an Ethernet switch for data communications supplying PoE such as switch 120 of FIG. 2a, or to switch 160 supplying data communications and midspan PSE 170 supplying PoE of FIG. 2b. PoE splitter and LAN card 210 is described herein as a single card, however this is not meant to be limiting in any way. The PoE splitting functionality as described in the above reference IEEE 802.3af standard may be separate from the LAN card functionality without exceeding the scope of the invention. Furthermore LAN card functionality need not be supplied and PoE may be delivered over wire pairs not actively carrying data without exceeding the scope of the invention.

One connection of PoE splitter and LAN card 210 is connected to a data connection as is known to those skilled in the art, which in an exemplary embodiment comprises a physical layer connection known as a PHY. The power output of PoE splitter and LAN card 210 is connected to DC/DC converters 410 and in parallel to optional MPS functionality 220, POE verification 240, and storage capacitor 235. Optional MPS functionality 220 is in an exemplary embodiment integrated within DC/DC converters 410. The outputs of DC/DC converters 410 are connected via respective ORing circuits 420, depicted herein as ORing diodes to each voltage output of power supply unit 280 which is to be backed up as will be described further. The output of PoE verification 240, denoted "PoE Good" is connected to a first input of AND gate 350.

AC mains connection 70 is connected to EMI filter 260 at the input of power supply 20. The output of EMI filter 260 is connected to the input of diode bridge 270 and the rectified output of diode bridge 270 is connected across storage capacitor 275 to the input of power supply unit 280. An output of controlled power supply unit 282 of power supply unit 280 denoted "DC Good" is connected to a second input of AND gate 350 and to an input of CPU and Chipset 290. An output of CPU and Chipset 290 denoted "PS_ON#" is connected to the remote powering control input of power supply unit 280. The output of AND gate 350 is connected to an input of CPU and Chipset 290 and via inverter 330 to both the input of interrupt controller 370 and the control input of DC/DC converters 410. The output of interrupt controller 370 is fed to a separate input of CPU and Chipset 290. An output of CPU and Chipset 290 denoted "Device Power Control" is fed to power control inputs of all connected devices (not shown) including hard drive 300. Power outputs denoted 3.3 V, 12 V, 5 V and 5 VSTBY of power supply unit 280 are shown connected to CPU and Chipset 290 however this is not meant to be limiting in any way. The power outputs are connected as required to elements of architecture 500 requiring power. In particular, hard drive 300 is connected to receive 5 V and 12 V outputs of controlled power supply unit 282, and volatile memory 310 is connected to receive power from power supply unit 280 irrespective of the state of the PS_ON# signal, in one embodiment from standby power supply 284. It is to be understood that devices connected to the 5 VSTBY line are arranged to receive power from power supply unit 280 either from controller power supply 282 or from standby power supply 284 in the event of a shut down of controlled power supply 282 via the PS_ON# signal. Power push button 510 is arranged to connect a signal to CPU and Chipset 290 indicative of a user desire to turn on/off the computer.

CPU and Chipset 290 are described herein as comprising a separate power management interface 295 however this is not meant to be limiting in any way, and is only intended as a functional description for clarity. In an exemplary embodiment power management interface 295 comprises the power management software functionality of the operating system running on CPU and Chipset 290. In a further exemplary embodiment the software functionality comprises ACPI. In an exemplary embodiment CPU and Chipset 290 includes a super I/O chip operable to generate the PS_ON# signal.

In operation PoE splitter and LAN card 210 provides a data interface for architecture 500 and splits out power from the data communication cabling. PoE splitter and LAN card 210 further supplies an appropriate signature resistance, optional classification and isolation switch functionality, preferably in accordance with IEEE 802.3af. Optional MPS functionality 220 ensures that sufficient power is drawn over the PoE connection to ensure that power is not disconnected. In an exemplary embodiment optional MPS functionality 220 sinks at least 10 mA for a minimum duration of 75 ms followed by a dropout period of no more than 250 ms thus ensuring a valid DC MPS component in the event that the PSE monitors the DC MPS component in accordance with the IEEE 802.3af standard. In another embodiment the PSE monitors only the AC MPS component and optional MPS functionality 220 is not required. In one embodiment DC/DC converters 410 may be designed to comprise MPS functionality 220 and thus a separate MPS functionality is not required. DC/DC converters 410 convert the received PoE electrical power which is at a nominal 48 volts to voltages appropriate for each of the voltage outputs of power supply unit 280 to be backed up. Storage capacitor 235 stores sufficient energy to support any momentary imbalance between the power supplied by PoE and the power required by architecture 500 as will be explained further hereinto below. PoE verification 240 outputs a logic high PoE Good signal when the PoE power input to DC/DC converters 410 is available and stable. The Power Selector Control signal is operable to turn on DC/DC converters 410 to full output. In an exemplary embodiment the Power Selector Control signal is not used as an input to DC/DC converters 410, and DC/DC converters 410 act responsive to an increased power draw via ORing circuits 420 to increase their power output.

In an alternative embodiment (not shown) PoE splitter and LAN card 210 provides additional communication functionality with the PSE sourcing the PoE electrical power. In an exemplary embodiment, information is transmitted indicating that the PoE connection is for standby use, and thus optional MPS functionality 220 is not required. In response to the received transmitted information indicating that the PoE is for standby backup, switch 120 of FIG. 2a and midspan PSE 170 of FIG. 2b, respectively, enable PoE backup power irrespective of a valid DC MPS component. In another embodiment, responsive to the information received, an AC MPS component is exclusively monitored. Such communication capability is further described in previously referenced and incorporated pending U.S. patent application Ser. No. 10/961,108 filed Oct. 12, 2004 entitled "Powered Device Interface Circuit".

AC power received from AC mains connection 70 is filtered via EMI filter 260, rectified by diode bridge 270, smoothed by storage capacitor 275 and fed to power supply unit 280. After power has stabilized, power supply unit 280 outputs a plurality of voltages from controlled power supply 282 and standby power supply 284, and the DC Good signal responsive to controlled power supply 282. Controlled power supply 282 outputs voltages only in response to a logic low input on PS_ON# which may be generated by a user pressing a power on switch (not shown). AND gate 350 outputs a logic high signal only in the event that the DC Good signal exhibits a logic high and PoE is available to support the operation of DC/DC converters 410 as indicated by the PoE Good exhibiting a logic high. It is to be noted that the DC Good signal may exhibit a logic high for a short period of time after the failure of AC mains power due to the inherent hold up time of power supply 20, and in particular that of controlled power supply 282.

Upon failure of the AC power, after any inherent hold up time has expired, the DC Good signal exhibits a logic low, and thus the output of AND gate 350 exhibits a logic low. In one embodiment a pull down resistor (not shown) ensures that in the absence of an active DC Good signal a logic low appears at the input of AND gate 350. The output of AND gate 350 is fed via inverter 330 to the input of interrupt controller 370 which interprets the logic high output of inverter 330, or the rising the rising edge thereof, as an interrupt event. The output of interrupt controller 370 is fed to CPU and Chipset 290 as an interrupt. In an exemplary embodiment, the interrupt is the system management interrupt (SMI). The output of inverter 330 is further connected to the control input of DC/DC converters 410 as the Power Selector Control signal. In one embodiment responsive to a logic high of the Power Selector Control signal DC/DC converters 410 are set to supply full power. In another embodiment DC/DC converters 410 are set to a slightly higher voltage than the nominal outputs of power supply unit 280 and thus automatically supply power via ORing circuits 420 when the outputs of power supply unit 280 decline and thus DC/DC converters 410 do not require the Power Selector Control signal as an input. In an exemplary embodiment, storage capacitor 235 is of a relatively large value to handle any temporary power imbalance between the power demand of devices in architecture 500 and the power available via the PoE channel comprising PoE splitter/LAN card 210.

CPU and Chipset 290 responsive to the interrupt generated by interrupt controller 370 calls a routine which stores context information on volatile memory 310 and then, via power management interface 295, operates the Device Power Control signal to place each of the connected devices in a reduced power mode. Preferably, the reduced power mode is a sleep mode in which device context is saved. In the event that a device context is stored by CPU and Chipset 290 on volatile memory 310 the device may be put into an off state to save additional power. The power requirements of architecture 500 responsive to each of the connected devices being placed in the above reduced power mode is less than or equal to the power available via the PoE channel. The operation of power management interface 295 to reduce the power demand of all connected devices takes some finite period of time, and capacitor 235 supports the temporary power imbalance until the imbalance is corrected by the successful reduction of power demand of the connected devices. It is to be understood that CPU and Chipset 290 is responsive to power management interface 295 to move to a standby low power mode. It is to be noted that in the above embodiment power supply unit 280 ceases operation after failure of the AC mains input, and the DC Good signal becomes a logic low.

As described above AND gate 350 outputs a logic high signal which is input to CPU and Chipset 290 only in the event that the DC Good signal exhibits a logic high and the output of DC/DC converters 410 is available and stable as indicated by a logic high POE Good signal. Such an input may be utilized by power management interface 295 to enable a user to set appropriate software settings responsive to the sensing of an available PoE based back up power.

Upon AC mains power being restored, responsive to user input such as the pushing of the power push button 510 controlled power supply 282 outputs stable power and sets the DC Good signal to a logic high. The POE Good signal remains logic high indicating that power was maintained during the failure of AC mains power, and the interrupt generated by interrupt controller 370 is thus cleared. Power management interface 295 responsive to the logic high DC Good signal and the cleared interrupt restores the context information and enables normal operation exiting the interrupt routine. Advantageously power management interface 295 allows continued operation without requiring a reboot.

Figure 4D:
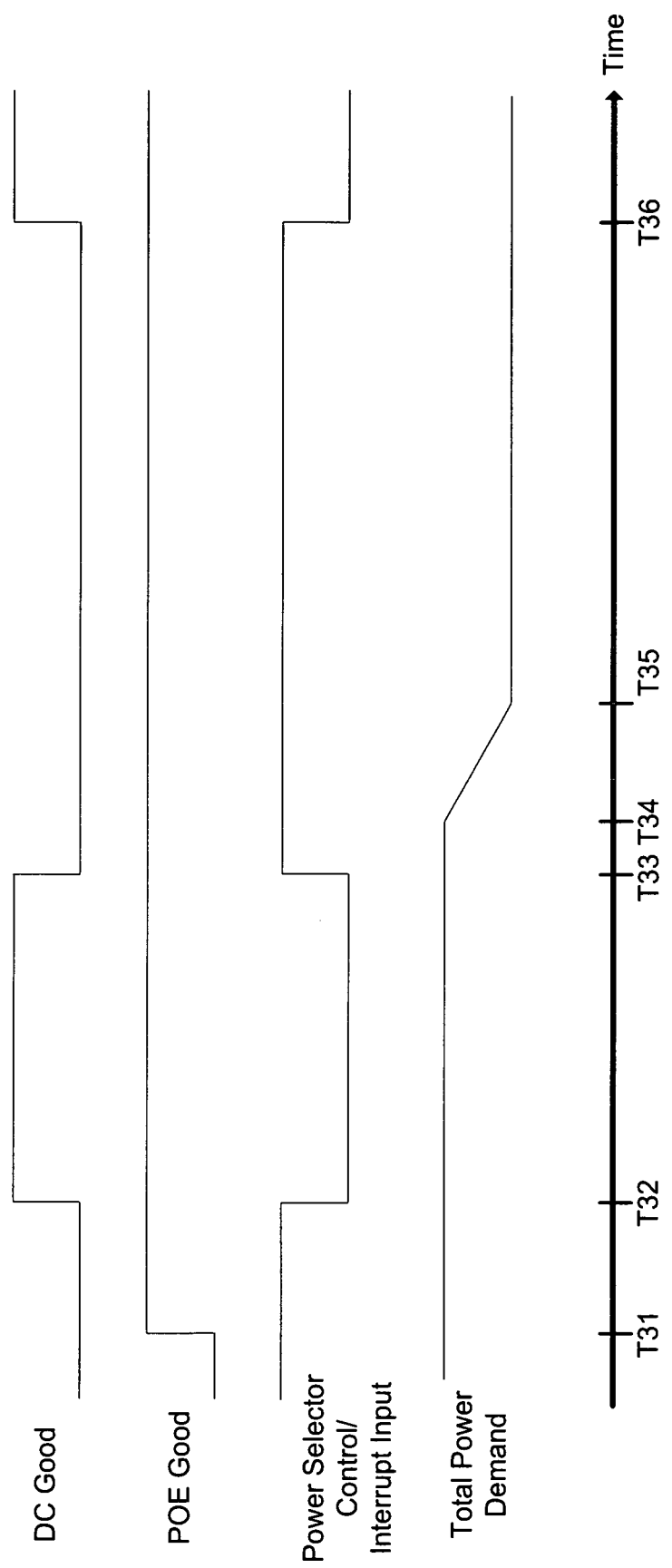
FIG. 4d is a timing diagram showing the relationship between certain signals and total power demand in the architecture of FIG. 3d in accordance with the principle of the current invention.

FIG. 4d is a timing diagram showing the relationship between certain signals in architecture 500 of FIG. 3d with the x-axis reflecting time. No attempt has been made to draw the timing diagrams to scale, and thus no meaning is to be imparted by the distances between events depicted. At time T31, PoE has been received and detected as stable by the operation of POE verification 240, and the PoE Good signal exhibits a logic high. At time T32, which in an exemplary embodiment may occur after the power button has been pushed by a user, the DC Good signal becomes a logic high indicating stable power from controlled power supply 282 is available. The Power Selector Control signal exhibits a logic low following time T32 responsive to the DC Good and PoE Good signals.

At time T33 the DC Good signal changes to a logic low due to the failure of AC mains power and an interrupt is generated via interrupt controller 370 to CPU and Chipset 290. Power is supplied by DC/DC converters 410 from power received over the PoE channel comprising PoE splitter and LAN card 210. Any temporary power imbalance is supplied from storage capacitor 235. At time T34, CPU and Chipset 290 has completed storing the context information on volatile memory 310 that will receive power during AC mains failure form DC/DC converters 410 and power management interface 295 via the associated Device Power Control signals begins to reduce total power demand. In another embodiment at time T34 CPU and Chipset 290 has begun the processes of reducing power demand by placing devices into a standby mode. At time T35 total power demand has been reduced to equal to or less than the power available over the PoE connection via PoE splitter and LAN card 210. In one embodiment CPU and Chipset 290 stores all context information on volatile memory 310 and in another embodiment all devices are placed in their minimum power state while maintaining context. Cache 305 of hard drive 300 is placed in a low power state and receives power from DC/DC converters 410 via ORing circuits 420. In another embodiment, power management interface 295 further turns off devices, setting them to a sleep or hibernate mode. In an exemplary embodiment at time T35 the thermal (CPU) fan has been turned off.

It is to be understood that architecture 500 sets an interrupt to CPU and Chipset 290 when the DC Good signal fails to exhibit a logic high and the PoE Good signal exhibits a logic high. Thus the interrupt reflects that controlled power supply unit 282 dose not present a valid output and backup power is available. The interrupt ends when the DC Good signal has been restored, as shown at time T36, as a result of the AC mains power being restored and the user pressing the power on switch thereby setting PS_ON# to a logic low and receiving from controlled power supply 282 a logic high DC Good signal. The Power Selector Control signal goes changes to exhibit a logic low, ending the interrupt to CPU and Chipset 290, and in one embodiment reducing the output of DC/DC converters 410. In another embodiment the output of DC/DC converters connected via ORing circuits 420 to the output of power supply unit 280 reduce their outputs responsive to the reappearance of nominal outputs from power supply unit 280. CPU and Chipset 290, responsive to the interrupt end and the received DC Good logic high restores context information and continues operation in a manner that will be explained further hereinto below.

Figure 3E:
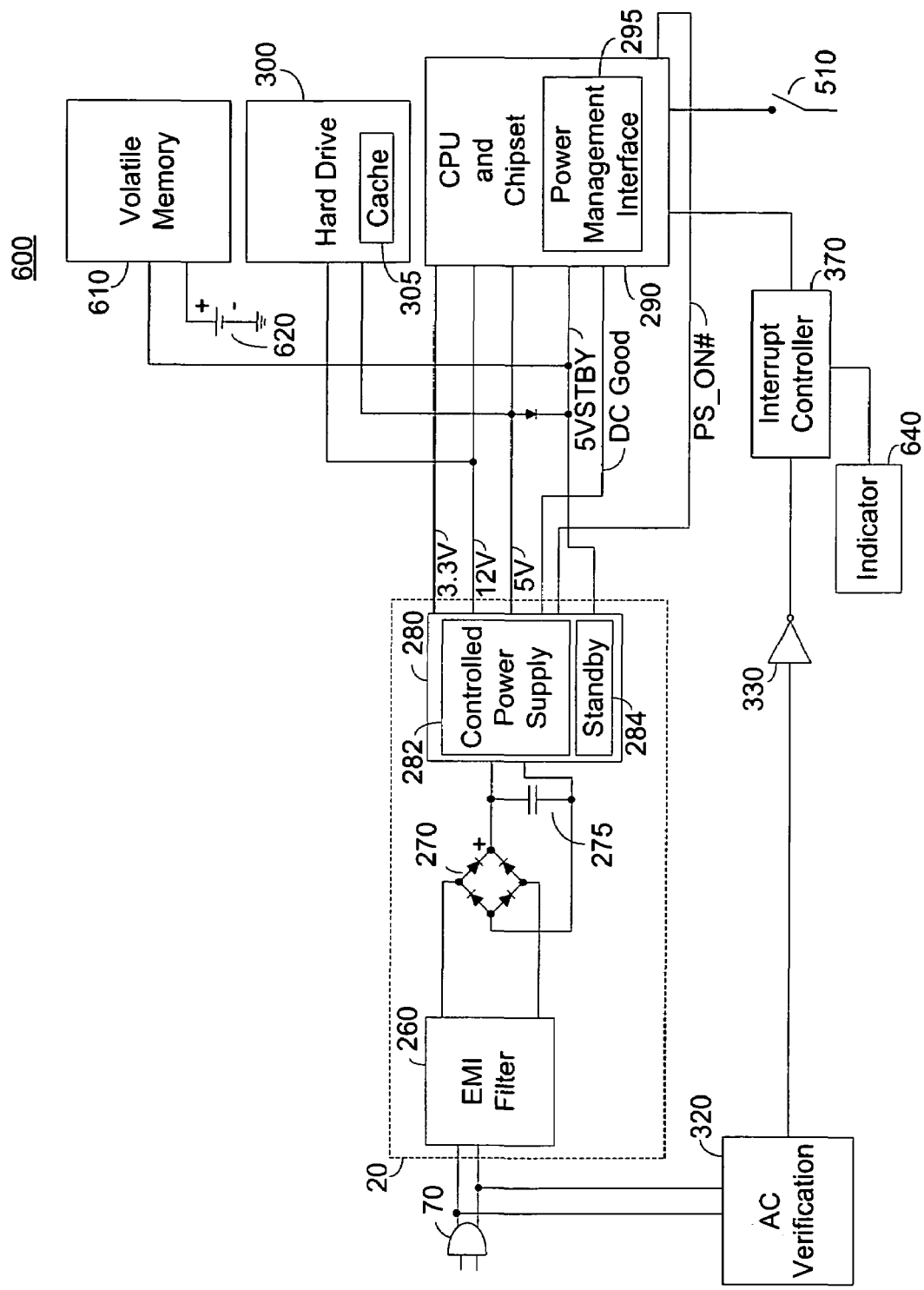
FIG. 3e is a high level block diagram of a embodiment of an architecture for supplying backup power via a battery to a volatile memory in accordance with the principle of the current invention.

FIG. 3e is a high level block diagram of a embodiment of an architecture for a computer, denoted architecture 600, providing backup power in accordance with the principle of the current invention. Architecture 600 comprises: AC mains connection 70; power supply 20 comprising EMI filter 260, diode bridge 270, storage capacitor 275 and power supply unit 280 comprising controlled power supply 282 and standby power supply 284; CPU and Chipset 290 comprising power management interface 295; hard drive 300 comprising cache memory 305; volatile memory 610; AC verification circuit 320; inverter 330; interrupt controller 370; power sourcing means 620; indicator 640 and power push button 510.

AC mains connection 70 is connected to EMI filter 260 at the input of power supply 20 and in parallel to AC verification circuit 320. The output of EMI filter 260 is connected to the input of diode bridge 270 and the rectified output of diode bridge 270 is connected across storage capacitor 275 to the input of power supply unit 280. The output of AC verification circuit 320 is connected via inverter 330 to the input of interrupt controller 370 and the output of interrupt controller 370 is fed to an input of CPU and Chipset 290. An output of CPU and Chipset 290 denoted "PS_ON#" is connected to the remote powering control input of power supply unit 280. Power push button 510 is arranged to connect a signal to CPU and Chipset 290 indicative of a user desire to turn on/off the computer. Indicator 640 is connected to interrupt controller 370. Power outputs denoted 3.3 V, 12 V, 5 V and 5 VSTBY of power supply unit 280 are shown connected to CPU and Chipset 290 however this is not meant to be limiting in any way. The power outputs are connected as required to elements of architecture 600 requiring power. In particular, hard drive 300 is connected to receive 5 V and 12 V outputs of controlled power supply unit 282, and volatile memory 310 is connected to receive power from power supply unit 280 irrespective of the state of the PS_ON# signal in one embodiment from standby power supply 284. It is to be understood that devices connected to the 5 VSTBY line are arranged to receive power from power supply unit 280 either from controller power supply 282 or from standby power supply 284 in the event of a shut down of controlled power supply 282 via the PS_ON# signal. Controlled power supply 282 further outputs a DC Good signal indicating that all outputs of controlled power supply 282 are valid, the DC Good signal being connected to an input of CPU and Chipset 290. Power source 620, which in an exemplary embodiment comprises a battery, is arranged to supply standby power to volatile memory 610. In one embodiment volatile memory comprises a static ram. In another embodiment power source 620 comprises a capacitor, the capacitor supplying sufficient electrical energy to maintain the contents of volatile memory 610 for short black out periods, such as those lasting from a few seconds to a few minutes. In another embodiment power source 620 comprises a high voltage capacitor connected across the input of power supply 20, the high voltage capacitor supplying sufficient electrical energy to maintain the contents of volatile memory 610 for short black out periods, such as those lasting from a few seconds to a few minutes. In another embodiment power source 620 comprises a flywheel energy storage system, preferably the flywheel energy storage system being of the microelectromechanical system (MEMS) variety.

CPU and Chipset 290 are described herein as comprising a separate power management interface 295 however this is not meant to be limiting in any way, and is only intended as a functional description for clarity. In an exemplary embodiment power management interface 295 comprises the power management software functionality of the operating system running on CPU and Chipset 290. In a further exemplary embodiment the software functionality comprises ACPI. In an exemplary embodiment CPU and Chipset 290 includes a super I/O chip operable to generate the PS_ON# signal.

In operation AC power received from AC mains connection 70 is filtered via EMI filter 260, rectified by diode bridge 270, smoothed by storage capacitor 275 and fed to power supply unit 280. After power has stabilized, lower supply unit 280 outputs a plurality of voltages from controlled power supply 282 and standby power supply 284, and the DC Good signal responsive to controlled power supply 282. Controlled power supply 282 outputs voltages only in response to a logic low input on PS_ON# which may be generated responsive to a user pressing power push button 510. AC power is monitored by AC verification circuit 320 which functions to identify a loss of power. In an exemplary embodiment AC verification circuit 320 monitors the AC voltage waveform and outputs a logic high signal when AC power is good and a negative signal when the AC waveform is absent or the form of the AC waveform is indicative of a loss of power. In an exemplary embodiment this is accomplished by sampling the incoming AC power voltage waveform, and comparing the sampled waveform with a pre-loaded standard waveform, thereby detecting any variation from the expected waveform. In one embodiment AC verification circuit 320 outputs a logic high signal within predetermined amount of time, preferably within 4 milliseconds or within ¼ of the cycle time, of the incoming AC power voltage waveform varying by more than 20% from the standard waveform. Inverter 330 inverts the output of AC verification circuit 320 prior to feeding it to interrupt controller 370. The output of interrupt controller 370 is fed to CPU and Chipset 290 as an interrupt. In an exemplary embodiment, the interrupt is the system management interrupt (SMI).

CPU and Chipset 290 responsive to the interrupt generated by interrupt controller 370 calls a routine which stores context information on volatile memory 610 and then, via power management interface 295, operates the device power control signal to place each of the connected devices in a sleep mode or off state. Any context to be saved is preferably saved on volatile memory 610 which is powered by power source 620. The operation of power management interface 295 to reduce the power demand of all connected devices takes some finite period of time, and capacitor 275 maintains valid DC power outputs long enough to enable CPU and Chipset 290 to store all required information on volatile memory 610. As indicated above volatile memory 610 is supported by a power source, such as a battery 620 and thus does not lose information during a failure of AC mains power source.

Upon AC mains power being restored, AC verification circuit 320 senses available AC power and outputs a logic high signal which is inverted by inverter 330 and clears the input to interrupt controller 370. Responsive to the cleared input, interrupt controller 370 clears the interrupt to CPU and Chipset 290 which is sensed by power management interface 295. Responsive to user input such as the pushing of the power push button 510 controlled power supply 282 outputs stable power and sets the DC Good signal to a logic high. Power management interface 295 responsive to the logic high DC Good signal and the cleared interrupt restores the context information from volatile memory 610 and enables normal operation exiting the interrupt routine. In an exemplary embodiment indicator 640, which may be an visible indicator such as an LED or an audible indicator, latches the setting and resetting of the interrupt from interrupt controller 370 indicating to the user that a power failure has occurred and that context information has been saved. Advantageously power management interface 295 allows continued operation without requiring a reboot.

Figure 4E:
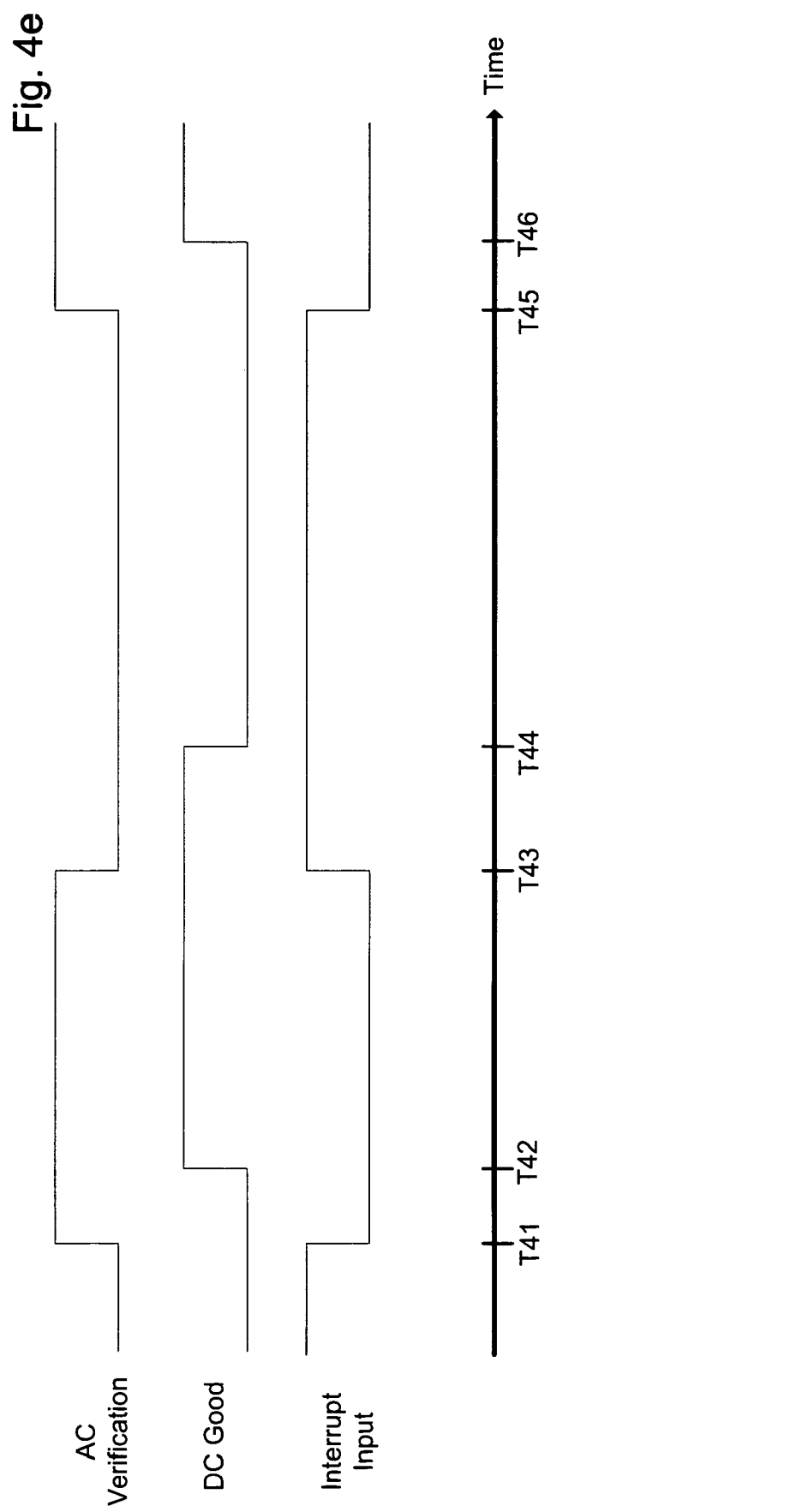
FIG. 4e is a timing diagram showing the relationship between certain signals in the architecture of FIG. 3e in accordance with the principle of the current invention.

FIG. 4e is a timing diagram showing the relationship between certain signals in architecture 600 of FIG. 3e with the x-axis reflecting time. No attempt has been made to draw the timing diagrams to scale, and thus no meaning is to be imparted by the distances between events depicted. At time T41 AC mains power has been received and is within the pre-determined range and the output of AC verification circuit 320 exhibits a logic high. At time T42, which in an exemplary embodiment may occur responsive to a user pressing power push button 510, the DC Good signal exhibits a logic high indicating stable power from controlled power supply 282 is available. The interrupt input signal is at a logic low responsive to the logic high output of AC verification circuit 320.

At time T43 the output of AC verification circuit 320 changes to a logic low, indicating that AC power is outside of a pre-determined range and the interrupt changes to a logic high interrupting CPU and Chipset 290 CPU and Chipset 290, and in particular power management interface 295, responsive to the received interrupt responds by promptly saving all context information to volatile memory 610. In one embodiment information in cache 305 is saved on volatile memory 610. In another embodiment a separate power source (not shown) supports cache 305. In yet another embodiment cache 305 is written to hard drive 300. At time T44, CPU and Chipset 290 has completed storing the context information on volatile memory 610 and the DC Good signal ceases to be supported at a logic high indicating the absence of power due to the expiration of the inherent hold up time of power supply 20.

At time T45 AC verification 320 indicates that the AC mains power has returned to be within the pre-determined range and the interrupt input is ended. At time T46 responsive to AC mains power being restored and the user pressing power push button 510 thereby setting PS_ON# to a logic low controlled power supply 282 outputs a logic high DC Good signal indicating that power outputs are reliably supplied. CPU and Chipset 290, responsive to the interrupt end and the received logic high DC Good signal restores context information from volatile memory 610 and continues operation in a manner that will be explained further hereinto below.

FIG. 5 illustrates a high level flow chart of an embodiment of the operation of the CPU and Chipset 290 of FIG. 3a in response to a power failure interrupt in accordance with the principle of the current invention. In stage 1000 an interrupt is received. In an exemplary embodiment the interrupt is coded as an SMI. In stage 1010 the interrupt handler is called. In an exemplary embodiment, the interrupt handler disables all other running threads. In one embodiment the interrupt handler is a BIOS routine and in another embodiment the interrupt handler is part of the operating system. The operating may be one of a Windows based operating system, a LINUX based operating system, a Macintosh OS operating system, or any other operating system without exceeding the scope of the invention.

In stage 1020 memory context not appearing on memory powered by the 5 VSTBY line is stored to volatile memory powered by the 5 VSTBY line. In an exemplary embodiment disk cache memory 305 of FIG. 3*a* is stored onto volatile memory to be stored by the 5 VSTBY line. In another embodiment disk cache memory is written to the hard drive. In stage 1030 CPU configuration context is saved to volatile memory powered by the 5 VSTBY line. Optionally in stage 1040 video memory information is saved to volatile memory powered by the 5 VSTBY line. In stage 1050, PS_ON# is pulled high thereby disabling power to all outputs of power supply unit 280 except for the respective output powering the 5 VSTBY line.

Figure 6A:
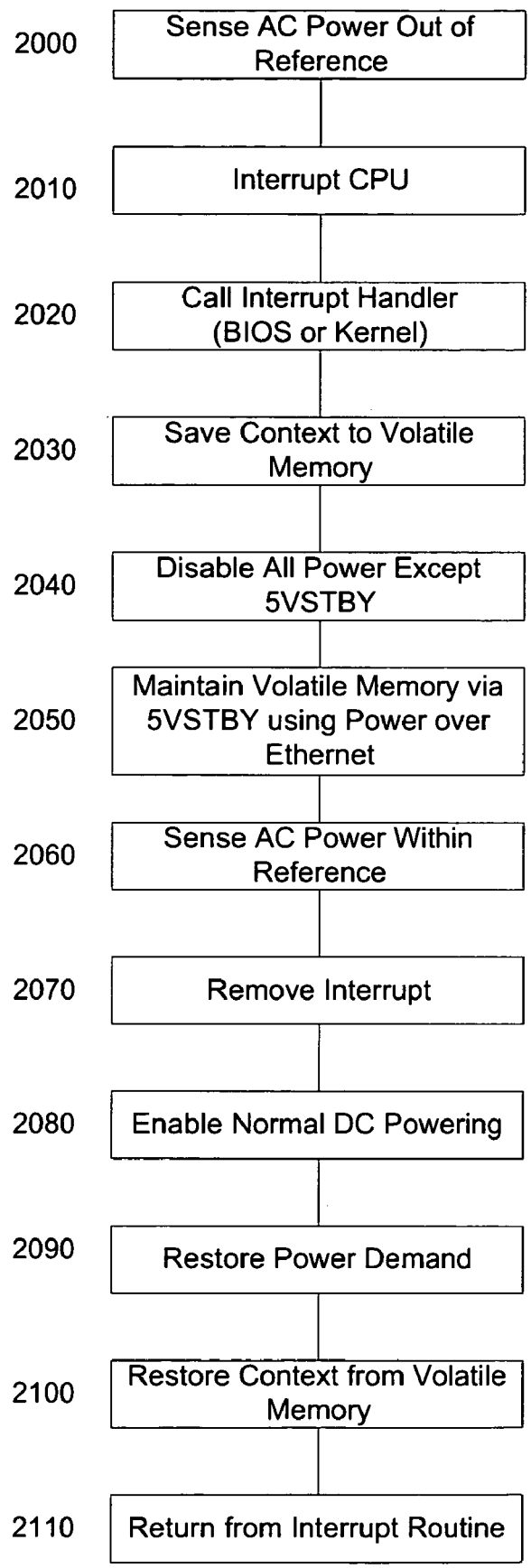
FIG. 6a illustrates a high level flow chart of an embodiment of the operation of the architecture of FIG. 3a in accordance with the principle of the current invention.

FIG. 6*a* illustrates a high level flow chart of an embodiment of the operation of architecture 200 of FIG. 3*a*. In stage 2000 AC power is sensed to be out of range of a pre-determined reference. In an exemplary embodiment the sensing is performed in advance of the DC voltages supplied from the AC power going out of regulation. Preferably, the sensing is performed within the time period of ¼ of a cycle of nominal mains power. Advantageously, such a sensing provides a time period of at least ¾ of a cycle of nominal mains power prior to DC voltages supplied from the AC power going out of regulation.

In stage 2010 an interrupt is transmitted to the CPU responsive to the sensing of stage 2000. In one embodiment the interrupt is the SMI interrupt. In stage 2020 an interrupt handler associated with the source of the interrupt is called. In one embodiment the interrupt handler is a BIOS routine, and in another embodiment the interrupt handler comprises an operating system routine running in the operating system kernel.

In stage 2030 context is saved to volatile memory. In an exemplary embodiment context comprises the contents of all memory locations and registers required to restart the operating system and restore the operating system to the current status and location after recovery of AC mains power. Without limitation this may comprise any one of the processor state normally stored in system management RAM (SMRAM) upon entering system management mode; control registers not stored upon entering system management mode; debug registers; multimedia extension (MMX) registers; floating point unit (FPU) registers; keyboard controller byte; interrupt registers and pointers; video memory context; and required flags for restarting. Context saved in stage 2030 is to volatile memory locations receiving back up power during failure of AC mains power.

In stage 2040 the main power supply of architecture 200 is powered down to only maintain the 5 VSTBY line. In an exemplary embodiment power management interface 295 of CPU and Chipset 290 sets the PS_ON# signal to a logic high. Power for all devices not powered by the 5 VSTBY line is therefore removed. The power demand in this state is less than can be supplied via the PoE channel.

In stage 2050 power is maintained for the volatile memory on which context was saved in stage 2030 during the failure of AC mains power utilizing the 5 VSTBY output of power supply unit 280, i.e. standby power supply 284. In an exemplary embodiment power is supplied via the PoE channel by maintaining the main power supply. There is no inherent limitation as to the amount of time for which the volatile memory is to receive power. Power for the PSE supporting the PoE channel may be provided from a separate AC mains connection, a centralized UPS and/or a generator to ensure that context information stored in stage 2030 is maintained.

In stage 2060 AC power is restored and sensed to be within reference. In an exemplary embodiment the sensing is performed prior to supply of DC output voltages within regulation. In stage 2070 the interrupt transmitted in stage 2010 is removed. In stage 2080 full DC power is enabled, preferably by remotely turning on the power supply. In another embodiment the user must initiate turn on off the power supply.

In stage 2090 devices which were powered down are placed in a reduced power mode in stage 2040 are restored to their previous hardware state. In the exemplary embodiment this further comprises enabling the thermal (CPU) fan and taking CPU and Chipset 290 out of the standby mode. In stage 2100 context stored on volatile memory as part of stage 2030 is restored. Preferably all registers and memory contents are restored as well as registers associated with devices restored in stage 2090. In stage 2110 the system has been fully restored to its state prior to the failure of AC mains power and a return from the interrupt routine called in stage 2020 occurs. Thus, preferably and advantageously no reboot is required to continue operation after power is restored.

Figure 6B:
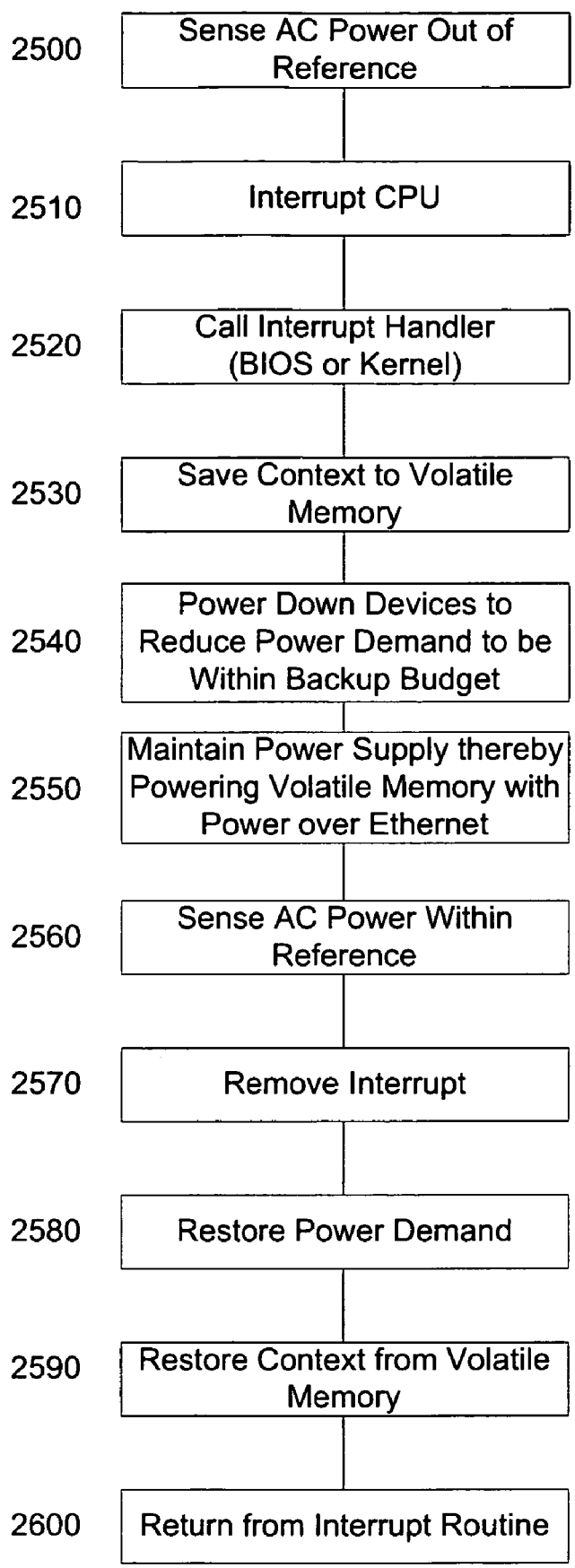
FIG. 6b illustrates a high level flow chart of an embodiment of the operation of the architecture of FIG. 3b in accordance with the principle of the current invention.

FIG. 6*b* illustrates a high level flow chart of an embodiment of the operation of architecture 400 of FIG. 3*b*. In stage 2500 AC power is sensed to be out of range of a pre-determined reference. In an exemplary embodiment the sensing is performed in advance of the DC voltages which are supplied from the AC power going out of regulation. Preferably, the sensing is performed within the time period of ¼ of a cycle of nominal mains power. Advantageously, such a sensing provides a time period of at least ¾ of a cycle of nominal mains power prior to DC voltages supplied from the AC power going out of regulation.

In stage 2510 an interrupt is transmitted to the CPU responsive to the sensing of stage 2500. In one embodiment the interrupt is the SMI interrupt. In stage 2520 an interrupt handler associated with the source of the interrupt is called. In one embodiment the interrupt handler is a BIOS routine, and in another embodiment the interrupt handler comprises an operating system routine running in the operating system kernel.

In stage 2530 context is saved to volatile memory. In an exemplary embodiment context comprises the contents of all memory locations and registers required to restart the operating system and restore the operating system to the current status and location after recovery of AC mains power. Without limitation this may comprise any one of the processor state normally stored in system management RAM (SMRAM) upon entering system management mode; control registers not stored upon entering system management mode; debug registers; multimedia extension (MMX) registers; floating point unit (FPU) registers; keyboard controller byte; interrupt registers and pointers; video memory context; and required flags for restarting. Context saved in stage 2530 is to volatile memory locations receiving back up power during failure of AC mains power.

In stage 2540 devices are powered down using power management interface 295. In one embodiment this is accomplished by powering down the southbridge and in another embodiment devices related to architecture 400 are each given a power down command. In an exemplary embodiment CPU and Chipset 290 is placed into a minimum power state and in another embodiment CPU and Chipset 290 is placed in a sleep mode. In an exemplary embodiment the thermal (CPU) fan is disabled as part of this stage. The power demand in this state is less than can be supplied via the PoE channel.

In stage 2550 power is maintained for the volatile memory on which context was saved in stage 2530 during the failure of AC mains power utilizing the power outputs of power supply unit 280. Advantageously all voltages are available, and thus data in cache 305 may be left undisturbed. In an exemplary embodiment power is supplied via the PoE channel by maintaining the main power supply. There is no inherent limitation as to the amount of time for which the volatile memory is to receive power. Power for the PSE supporting the PoE channel may be provided from a separate AC mains connection, a centralized UPS and/or a generator to ensure that context information stored in stage 2530 is maintained.

In stage 2560 AC power is restored and sensed to be within reference. In an exemplary embodiment the sensing is performed prior to supply of DC output voltages within regulation. In stage 2570 the interrupt transmitted in stage 2510 is removed. In stage 2580 devices powered down or placed into a sleep mode in stage 2540 are restored to their previous hardware state, i.e. full operating mode. In the exemplary embodiment this further comprises enabling the thermal (CPU) fan and taking CPU and Chipset 290 out of the standby mode. In stage 2590 context stored on volatile memory as part of stage 2530 is restored. Preferably all registers and memory contents are restored as well as registers associated with devices restored in stage 2580. In stage 2600 the system has been fully restored to its state prior to the failure of AC mains power and a return from the interrupt routine called in stage 2520 occurs. Thus, preferably and advantageously no reboot is required to continue operation after power is restored.

Figure 6C:
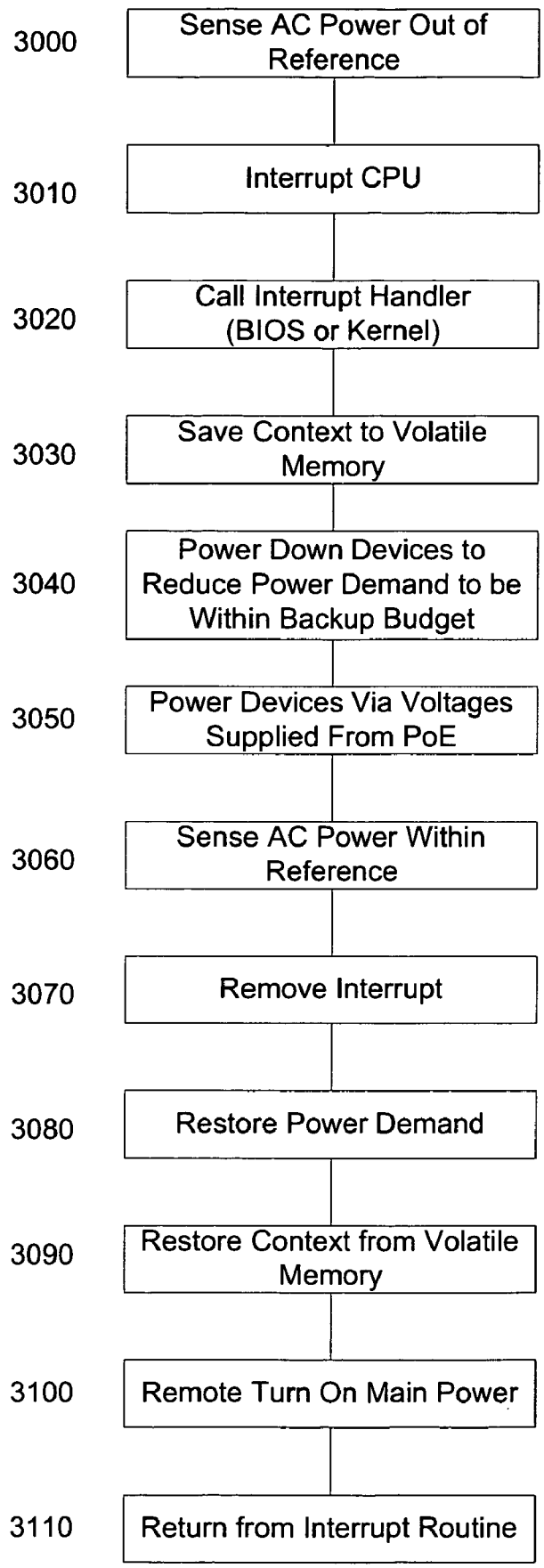
FIG. 6c illustrates a high level flow chart of an embodiment of the operation of the architecture of FIG. 3c in accordance with the principle of the current invention.

FIG. 6c illustrates a high level flow chart of an embodiment of the operation of architecture 450 of FIG. 3c. In stage 3000 AC power is sensed to be out of range of a pre-determined reference. In an exemplary embodiment the sensing is performed in advance of the DC voltages which are supplied from the AC power going out of regulation. Preferably, the sensing is performed within the time period of ¼ of a cycle of nominal mains power. Advantageously, such a sensing provides a time period of at least ¾ of a cycle of nominal mains power prior to DC voltages supplied from the AC power going out of regulation.

In stage 3010 an interrupt is transmitted to the CPU responsive to the sensing of stage 3000. In one embodiment the interrupt is the SMI interrupt. In stage 3020 an interrupt handler associated with the source of the interrupt is called. In one embodiment the interrupt handler is a BIOS routine, and in another embodiment the interrupt handler comprises an operating system routine running in the operating system kernel.

In stage 3030 context is saved to volatile memory. In an exemplary embodiment context comprises the contents of all memory locations and registers required to restart the operating system and restore the operating system to the current status and location after recovery of AC mains power. Without limitation this may comprise any one of the processor state normally stored in system management RAM (SMRAM) upon entering system management mode; control registers not stored upon entering system management mode; debug registers; multimedia extension (MMX) registers; floating point unit (FPU) registers; keyboard controller byte; interrupt registers and pointers; video memory context; and required flags for restarting. Context saved in stage 3030 is to volatile memory locations receiving back up power during failure of AC mains power.

In stage 3040 devices are powered down using power management interface 295. In one embodiment this is accomplished by powering down the southbridge and in another embodiment every device related to architecture 450 is given a power down command. In an exemplary embodiment CPU and Chipset 290 is placed into a minimum power state and in another embodiment CPU and Chipset 290 is placed in a sleep mode. In an exemplary embodiment the thermal (CPU) fan is disabled as part of this stage. The power demand in this state is less than can be supplied via the PoE channel.

In stage 3050 power is maintained for the volatile memory on which context was saved in stage 3030 during the failure of AC mains power utilizing voltages derived from the PoE channel via DC/DC converters 410. The main computer power supply is not operational. Advantageously all voltages are available, and thus data in cache 305 may be left undisturbed. There is no inherent limitation as to the amount of time for which the volatile memory is to receive power. Power for the PSE supporting the PoE channel may be provided from a separate AC mains connection, a centralized UPS and/or a generator to ensure that context information stored in stage 3030 is maintained.

In stage 3060 AC power is restored and sensed to be within reference. In an exemplary embodiment the sensing is performed prior to supply of DC output voltages within regulation. In stage 3070 the interrupt transmitted in stage 3010 is removed. In stage 3080 controlled power supply 282 is enabled, preferably by setting PS_ON# to a logic low and the DC Good signal is sensed at a logic high confirming power availability. Devices powered down or placed into a sleep mode in stage 3040 are restored to their previous hardware state, i.e. full operating mode. In the exemplary embodiment this further comprises enabling the thermal (CPU) fan and taking the processor out of the standby mode. In stage 3090 context stored on volatile memory as part of stage 3030 is restored. Preferably all registers and memory contents are restored as well as registers associated with devices restored in stage 3080. In stage 3110 the system has been fully restored to its state prior to the failure of AC mains power and a return from the interrupt routine called in stage 3020 occurs. Thus, preferably and advantageously no reboot is required to continue operation after power is restored.

Figure 6D:
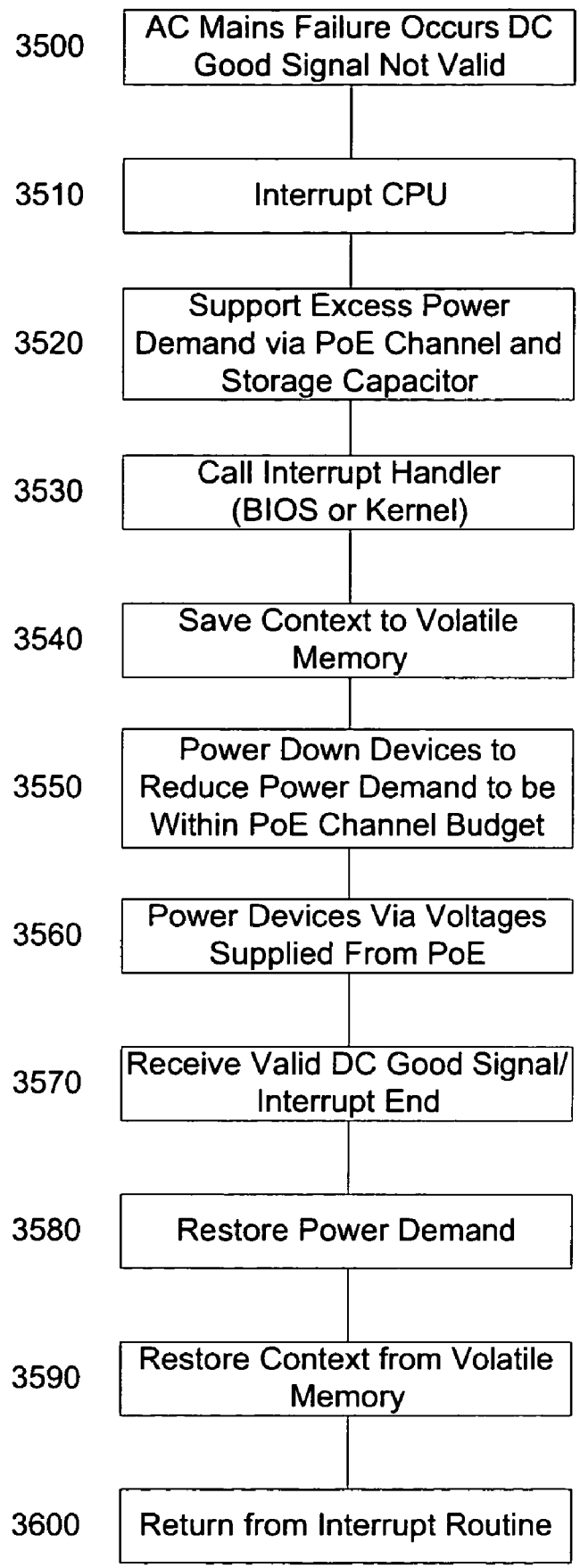
FIG. 6d illustrates a high level flow chart of an embodiment of the operation of the architecture of FIG. 3d in accordance with the principle of the current invention.

FIG. 6d illustrates a high level flow chart of an embodiment of the operation of architecture 500 of FIG. 3d. In stage 3500 AC mains power fails and results in the DC Good signal failing to be supported at a logic high indicating that DC power supplied from AC mains power is out of regulation.

In stage 3510 an interrupt is transmitted to the CPU responsive to the lack of logic high in DC Good signal of stage 3500. In one embodiment the interrupt is the SMI interrupt. In stage 3520 all voltages required for architecture 500 and associated devices are supplied by a PoE channel, with any temporary mismatch between power required by architecture 500 and power available from the PoE channel being supported by storage capacitor 235. In stage 353 an interrupt handler associated with the source of the interrupt is called. In one embodiment the interrupt handler is a BIOS routine, and in another embodiment the interrupt handler comprises an operating system routine running in the operating system kernel.

In stage 3540 context is saved to volatile memory. In an exemplary embodiment context comprises the contents of all memory locations and registers required to restart the operating system and restore the operating system to the current status and location after recovery of AC mains power. Without limitation this may comprise any one of the processor state normally stored in system management RAM (SMRAM) upon entering system management mode; control registers not stored upon entering system management mode; debug registers; multimedia extension (MMX) registers; floating point unit (FPU) registers; keyboard controller byte; interrupt registers and pointers; video memory context; and required flags for restarting. Context saved in stage 3030 is to volatile memory locations receiving back up power during failure of AC mains power.

In stage 3550 devices are powered down using power management interface 295. In one embodiment this is accomplished by powering down the southbridge and in another embodiment every device related to architecture 500 is given a power down command. In an exemplary embodiment CPU and Chipset 290 is placed into a minimum power state and in another embodiment CPU and Chipset 290 is placed in a sleep mode. In an exemplary embodiment the thermal (CPU) fan is disabled as part of this stage. The power demand in this state is less than or equal to the amount of power which can be supplied via the PoE channel. CPU and Chipset 290 is placed into a power down mode in which it remains responsive to interrupt controller 370. In one embodiment CPU and Chipset 290 maintains a logic low PS_ON# signal.

In stage 3560 power is maintained for the volatile memory on which context was saved in stage 3540 during the failure of AC mains power utilizing voltages derived from the PoE channel. The main computer power supply is not operational. Advantageously all voltages are available, and thus data in cache 305 may be left undisturbed. There is no inherent limitation as to the amount of time for which the volatile memory is to receive power. Power for the PSE supporting the PoE channel may be provided from a separate AC mains connection, a centralized UPS and/or a generator to ensure that context information stored in stage 3540 is maintained.

In stage 3570 AC power is restored and responsive to the logic low PS_ON# signal a logic high DC Good signal is received by CPU and Chipset 290. Additionally, the interrupt received in step 3510 is removed. In another embodiment a logic low PS_ON# signal is generated by the user pushing a power on button and a logic high DC Good signal is receive by CPU and Chipset 290 responsive to the user pushing the power on button. In stage 3580 devices powered down or placed into a sleep mode in stage 3550 are restored to their previous hardware state, i.e. full operating mode. In the exemplary embodiment this further comprises enabling the thermal (CPU) fan and taking CPU and Chipset 290 out of the standby or sleep set in stage 3550 mode. In stage 3590 context stored on volatile memory as part of stage 3540 is restored. Preferably all registers and memory contents are restored as well as registers associated with devices restored in stage 3580. In stage 3600 the system has been fully restored to its state prior to the failure of AC mains power and a return from the interrupt routine called in stage 3530 occurs. Thus, preferably and advantageously no reboot is required to continue operation after power is restored.

Figure 6E:
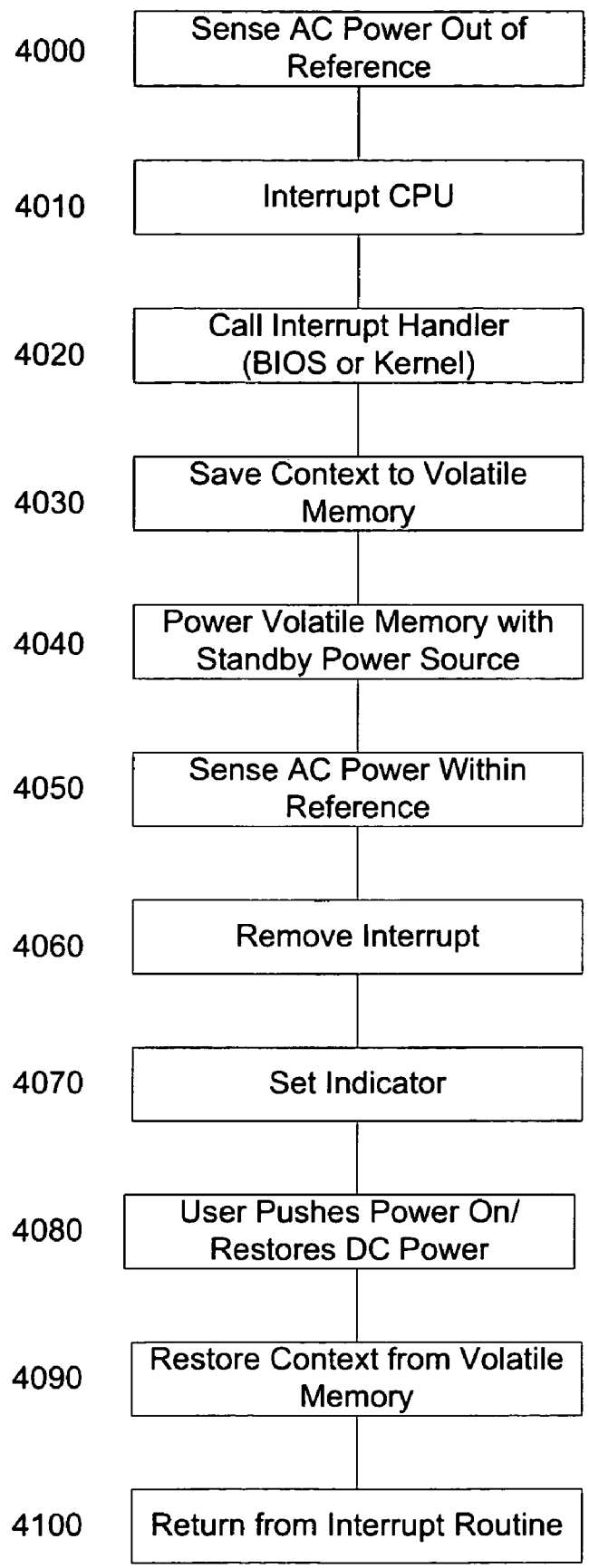
FIG. 6e illustrates a high level flow chart of an embodiment of the operation of the architecture of FIG. 3e in accordance with the principle of the current invention.

FIG. 6e illustrates a high level flow chart of an embodiment of the operation of architecture 600 of FIG. 3e. In stage 4000 AC power is sensed to be out of range of a pre-determined reference. In an exemplary embodiment the sensing is performed in advance of DC voltages supplied from the AC power going out of regulation. Preferably, the sensing is performed within the time period of ¼ of a cycle of nominal mains power. Advantageously, such a sensing provides a time period of at least ¾ of a cycle of nominal mains power prior to the DC voltage which supplied from the AC power going out of regulation.

In stage 4010 an interrupt is transmitted to the CPU responsive to the sensing of stage 4000. In one embodiment the interrupt is the SMI interrupt. In stage 4020 an interrupt handler associated with the source of the interrupt is called. In one embodiment the interrupt handler is a BIOS routine, and in another embodiment the interrupt handler comprises an operating system routine running in the operating system kernel.

In stage 4030 context is saved to volatile memory. In an exemplary embodiment context comprises the contents of all memory locations and registers required to restart the operating system and restore the operating system to the current status and location after recovery of AC mains power. Without limitation this may comprise any one of the processor state normally stored in system management RAM (SMRAM) upon entering system management mode; control registers not stored upon entering system management mode; debug registers; multimedia extension (MMX) registers; floating point unit (FPU) registers; keyboard controller byte; interrupt registers and pointers; video memory context; and required flags for restarting. Context saved in stage 4030 is to volatile memory locations receiving back up power during failure of AC mains power.

In stage 4040 power is maintained for the volatile memory on which context was saved in stage 4030 during the failure of AC mains power utilizing a standby power source. In an exemplary embodiment the standby power source is a battery. The main computer power supply is not operational.

In stage 4050 AC power is restored and sensed. In an exemplary embodiment the sensing is performed prior to supply of DC output voltages within regulation. In stage 4060 the interrupt transmitted in stage 4010 is removed. In stage 4070 an indicator is preferably activated indicating to the user that power has been restored and that context information was saved during the power failure. In stage 4080 a user restores power from power supply 20 by pushing power push button 510. In another embodiment power supply 20 is configured to automatically restart and supply DC outputs upon receipt of AC mains power within tolerance. In such an embodiment the user action of stage 4080 is not required and power is automatically restored. In stage 4090 context stored on volatile memory as part of stage 4030 is restored. In stage 4100 the system has been fully restored to its state prior to the failure of AC mains power and a return from the interrupt routine called in stage 4020 occurs. Thus, preferably and advantageously no reboot is required to continue operation after power is restored.

Figure 7A:
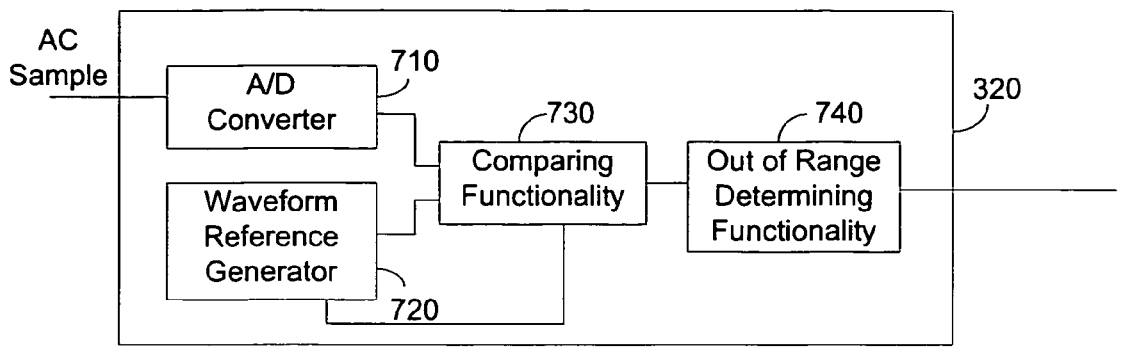
FIG. 7a illustrates a high level functional block diagram of a first embodiment of an AC verification circuit in accordance with the principle of the current invention.

FIG. 7a illustrates a high level functional block diagram of a first embodiment of an AC verification circuit 320 comprising an A/D converter 710, a waveform reference generator 720, a comparing functionality 730 and an out of range determining functionality 740. An AC sample input is connected to the input of A/D converter 710 and the output of A/D converter 710 is fed to a first input of comparing functionality 730. The output of waveform reference generator 720 is connected to a second input of comparing functionality 730 and the feedback output of comparing functionality is connected to the feedback input of waveform reference generator 720. The output of comparing functionality 730 is connected to the input of out of range determining functionality 740 and the output of out of range functionality 740 is connected as the output of AC verification circuit 320.

In operation A/D converter 710 receives an AC sample waveform from the AC input and converts the sample to a digital representation. In an exemplary embodiment the sample is derived via a resistor divider network. Waveform reference generator 720 generates a digital representation of an expected waveform. In an exemplary embodiment waveform reference generator 720 maintains phase information by receiving a feedback from comparing functionality 730 as will be described further hereinto below. Comparing functionality 730 which may be implemented in a general purpose microcontroller or a digital signal processor compares the digital representation of the input AC waveform and the output of waveform reference generator 720. In an exemplary embodiment a plurality of voltage waveforms are stored in waveform reference generator 720 and in an initialization phase the appropriate waveform, including voltage and cycle time, is determined.

In the event of a phase drift or initial phase lock, phase difference information is transmitted from comparing functionality 730 to waveform reference generator 720 so as to align the waveform being generating by waveform reference generator 720 with the incoming AC waveform. Out of range determining functionality 740 compares the difference if any found by comparing functionality 730 to determine whether the incoming AC waveform is within a pre-determined range of the reference waveform. In the event that the incoming AC waveform is determined to be within the pre-determined range a logic high signal is output. In the event that the incoming AC -waveform is determined to not be within the pre-determined range a logic low signal is output.

Figure 7B:
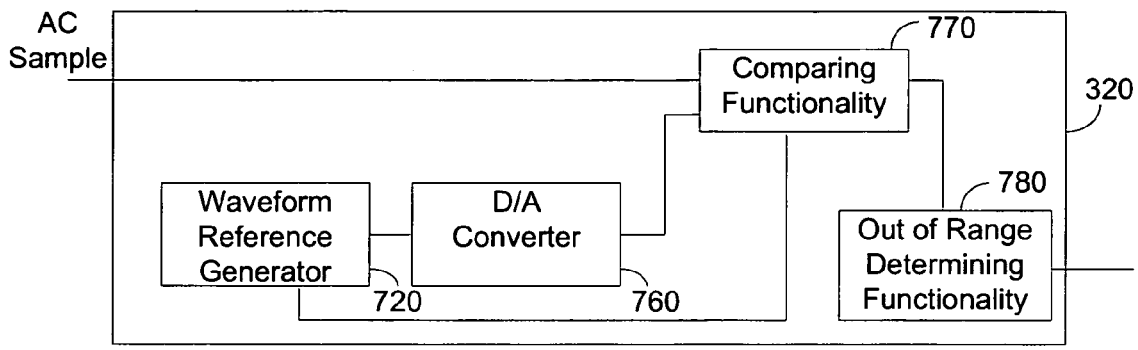
FIG. 7b illustrates a high level functional block diagram of a second embodiment of an AC verification circuit in accordance with the principle of the current invention.

FIG. 7b illustrates a high level functional block diagram of a second embodiment of an AC verification circuit 320 comprising waveform reference generator 720, a D/A converter 760, a comparing functionality 770 and an out of range determining functionality 780. An AC sample input is connected to a first input of comparing functionality 770. The output of waveform reference generator 720 is connected to the input of D/A converter 760 and the output of D/A converter 760 is connected to a second input of comparing functionality 770. A feedback output of comparing functionality 770 is connected to a feedback input of waveform reference generator 720. The output of comparing functionality 770 is connected to the input of out of range determining functionality 780. The output of out of range functionality 780 is connected as the output of AC verification circuit 320.

In operation waveform reference generator 720 generates a digital representation of an expected waveform. In an exemplary embodiment waveform reference generator 720 maintains phase information by receiving a feedback from comparing functionality 730 as will be described further hereinto below. D/A converter 760 converts the digital representation output by waveform reference generator 720 to an analog voltage of appropriate amplitude to compare with the input AC sample. Comparing functionality 770 which may be implemented as an analog circuit compares the AC sample input to the analog output of D/A converter 760. In an exemplary embodiment a plurality of voltage waveforms are stored in waveform reference generator 720 and in an initialization phase the appropriate waveform, including voltage and cycle time, is determined.

In the event of a phase drift or initial phase lock, phase difference information is transmitted from comparing functionality 770 to waveform reference generator 720 so as to align the waveform being generating by waveform reference generator 720 with the incoming AC waveform. The output of comparing functionality 770 thus represents the amplitude difference at any time between the input AC sample and expected waveform as generated by waveform reference generator 720. Out of range determining functionality 740 compares the difference if any found by comparing functionality 770 to determine whether the incoming AC waveform is within a pre-determined range of the reference. In the event that the incoming AC waveform is determined to be within the pre-determined range a logic high signal is output. In the event that the incoming AC waveform is determined to not be within the pre-determined range a logic low signal is output.

Figure 7C:
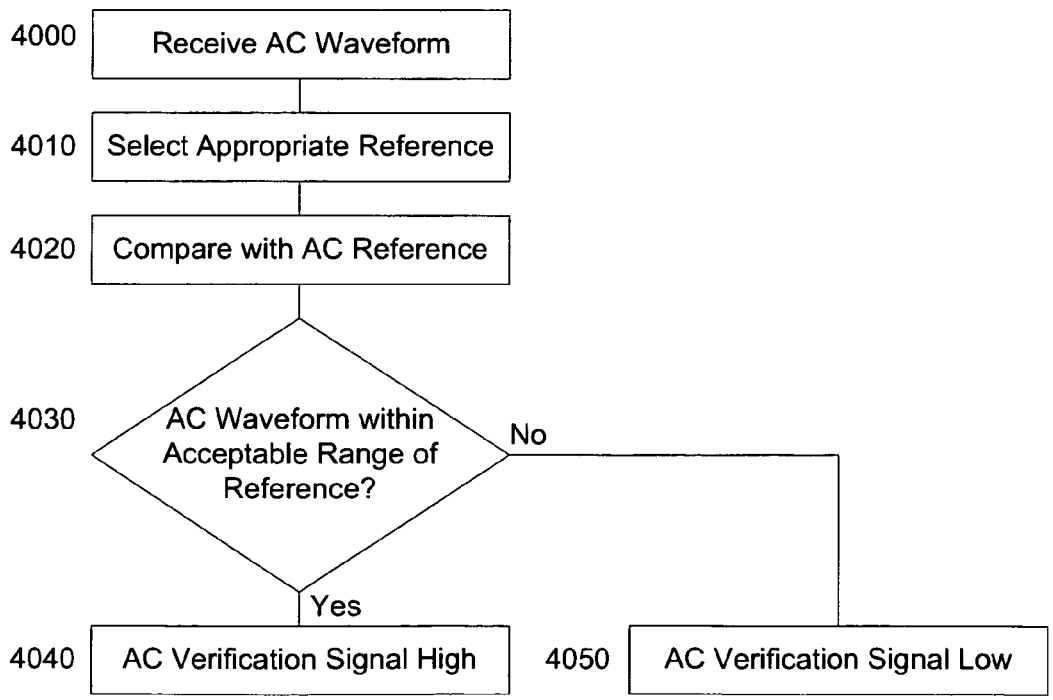
FIG. 7c illustrates a high level flow chart of the operation of an AC verification circuit in accordance with the principle of the current invention.

FIG. 7c illustrates a high level flow chart of the operation of AC verification circuit 320. In stage 4000 an AC waveform sample representative of AC mains power is received. In an exemplary embodiment the received AC waveform sample is a small sampled portion of the AC mains power. In stage 4010 an appropriate reference waveform, in terms of voltage and frequency, is selected. In stage 4020 the incoming AC waveform sample is compared with an AC reference waveform. In one embodiment the AC reference waveform is generated by a digital representation of the expected waveform, preferably dynamically adjusted for any phase difference between the reference and the AC waveform sample.

In stage 4030 the AC reference waveform is compared with the AC waveform sample to determine if the two waveforms are within a pre-determined range of each other. In one embodiment, as illustrated in FIG. 7a, the AC waveform sample is first digitized via an A/D converter, and in another embodiment, as illustrated in FIG. 7b, the AC reference waveform is converted to an analog reference waveform. In the event that the two waveforms are within the pre-determined range, in stage 4040 a logic high AC verification signal is output. In the event that in stage 4030 the two waveforms are not within the pre-determined range, in stage 4050 a logic low AC verification signal is output.

Figure 8:
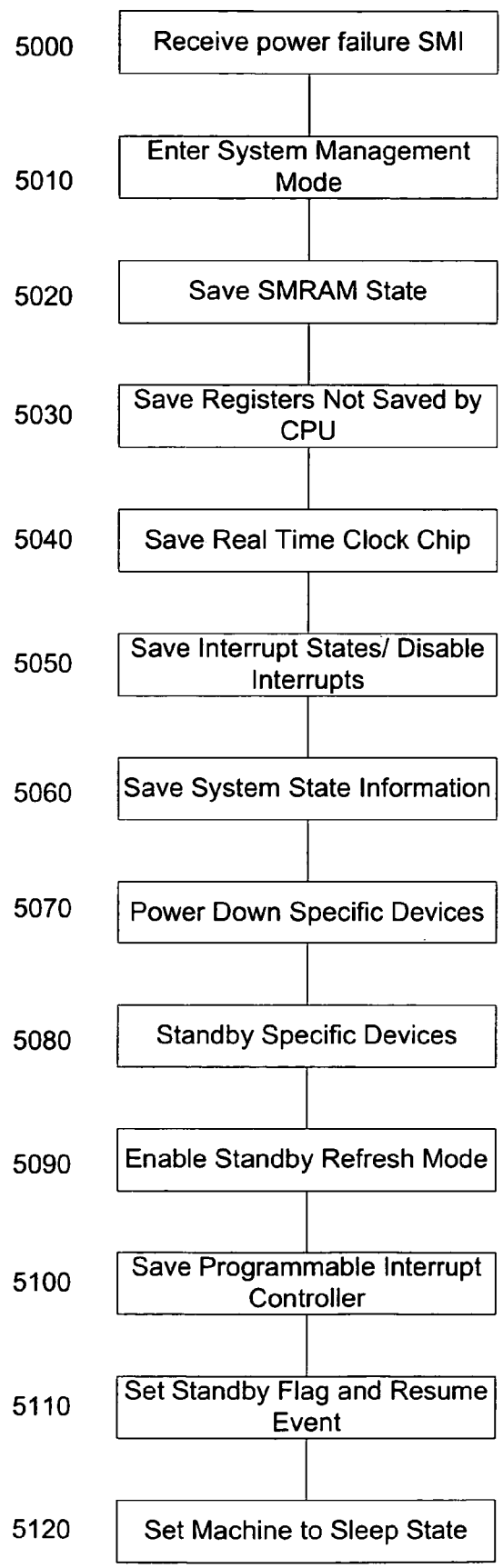
FIG. 8 is a high level flow chart of the operation of an embodiment of a BIOS routine utilizing a system management interrupt according to the principle of the current invention.

FIG. 8 is a high level flow chart of the operation of an embodiment of a BIOS routine utilizing SMI in accordance with the embodiment of FIG. 3b according to the principle of the current invention. In stage 5000 an SMI interrupt is received and is identified as being generated by AC verification circuit 320. In an exemplary embodiment the Power Selector Control signal is connected to an open pin of CPU and Chipset 290 thereby enabling identification by an SMI handler. In stage 5010 CPU and Chipset 290 enters system management mode (SMM) responsive to the identified interrupt of stage 5000, in an exemplary embodiment by the CPU sending a signal to the Chipset. In an exemplary embodiment the signal is SMIACT#. In stage 5020 CPU and Chipset 290 saves a substantial part of its current state in the stage save map within system management RAM (SMRAM), initializes some registers to provide an SMM execution environment, and then begins execution inside SMM. If required the system management base is remapped to the appropriate physical system memory. It is to be understood that SMRAM is comprised within volatile memory 310.

In stage 5030 registers not saved by CPU and Chipset 290 upon entering SMM are saved, preferably in SMRAM. In stage 5040 the state of the real time clock chip is stored in volatile memory, preferably in SMRAM. In stage 5050 interrupt stages are saved, preferably in SMRAM and interrupts are disabled. Disabling interrupts allows for completion of the saving routine within a short amount of time.

In stage 5060 system state information not previously saved is stored, preferably in SMRAM. Stage 5060 comprises saving at least one of a coprocessor state, state of port 92h, keyboard controller command byte, A20 state, COM port state, LPT port state, and video state. Preferably the above is saved in SMRAM, or in additional memory locations allocated within volatile memory 310.

In stage 5070 specific devices are powered down. The selection of specific devices is based on the actual architecture, and in particular involves knowledge of the actual associated devices which are configured to be powered down. Preferably, the devices powered down as part of stage 5070 comprise the thermal fan associated with the CPU. In stage 5080 specific devices are placed in a standby mode. The selection of specific devices to be placed in standby mode is based on the actual architecture, and in particular involves knowledge of the actual associated devices which are configured to be placed in standby mode. In an exemplary embodiment specific devices comprise at least one of PS/2 ports, LAN devices, audio devices, USB ports, IEEE 1394 ports, and an IDE hard disk.

In stage 5090 a standby refresh mode is enabled. Volatile memory 310 typically comprises dynamic RAM and as such circuitry to refresh the dynamic RAM must be enabled to avoid loss of information during standby mode. In stage 5100 the programmable interrupt controller is saved in real mode. In stage 5110 a standby flag is set so that upon rebooting the CPU is aware of the standby mode. Stage 5110 further comprises setting a standby resume event. In an exemplary embodiment this is the removal of the SMI interrupt and the low level of the Power Selector Control signal. In stage 5120 devices in the architecture not yet in standby or powered down, are placed in sleep state. In an exemplary embodiment this is accomplished via the southbridge.

FIG. 9 is a high level flow chart of the operation of an embodiment of the operation of the architecture of any of FIGS. 3*a*-3*d* according to the principle of the invention for alternative operation with high power over Ethernet, also known as PoE plus, or PoE in accordance with the power limits of IEEE 802.3af. High power over Ethernet allows for power in excess of the limits of IEEE 802.3af and is further described in co-pending U.S. patent application Ser. No. 10/761,327 filed Jan. 22, 2004 entitled "High Power Architecture for Power Over Ethernet" the entire contents of which are incorporated by reference. Utilizing high power, preferably power in excess of 40 watts, and even further preferably power in excess of 60 watts, sufficient power is available to support operation of the computer for hibernation. The term hibernation is meant to include a complete shut down of the computer, in which all volatile memory and context is properly stored on non-volatile memory.

In stage 6000 the routine initializes including loading information indicating the current hardware configuration and the appropriate routine selected from the routines of FIGS. 6*a*-6*d*. In stage 6010 the PoE connection is polled to ascertain if it is a high power connection or alternatively a low power connection having power limits on the order of the limits according to IEEE 802.3af. The polling may be accomplished by data transfer through the computer, or by automatic sensing of powering on a plurality of paths supporting high power.

In the event that in stage 6010 it is determined that power is available on the order of the limits according to IEEE 802.3af, in stage 6020 the routine selected in stage 6000 from the routines of FIGS. 6*a*-6*d* is loaded and executed.

In the event that in stage 6010 it is determined that power is available in excess of the order of the limits according to IEEE 802.3af, in stage 6030 it is determined that high power is available and the routine which will be explained below is loaded. In alternative embodiment, a pointer for operation is loaded for use responsive to an input from the AC verification circuit.

In stage 6040 AC verification circuit 320 senses that AC power is out of reference. In stage 6050 an interrupt is transmitted to the CPU indicating a power event has occurred, and that the CPU should immediately proceed to hibernation.

In stage 6060 the high power connection supports the complete computer operation during storage of all memory and context information on non-volatile memory. In stage 6070 hibernation is complete and the CPU initiates a complete shut down.

The above embodiments have been described in relation to a single CPU, however this is not meant to be limiting in any way. In particular it is meant to include a computer having a plurality of chip cores, in which one of the plurality of chip cores is operable responsive to an interrupt indicative of a powering down event to reduce power consumption as described above in relation to any of FIGS. 6*a*-6*e*.

The above embodiments have been described as having a dedicated PoE connection, however this is not meant to be limiting in any way. In one embodiment (not shown) power received via the PoE connection is forwarded to another device, such as an IP telephone, with a portion being reserved for back-up needs, such as the charging of capacitor 235 of FIG. 3*a*. In the event of an AC mains failure, power forwarding is preferably interrupted, and the PoE connection is used exclusively to accomplish back-up as described above.

Thus, the present embodiments enable a backup of a computer in the event of power failure on a volatile memory receiving power during mains power failure, preferably by utilizing PoE. In particular, a failure of mains power is detected and an interrupt to the processor is generated, with the interrupt routine saving context information and data to volatile memory locations receiving backup power. The PoE connection provides backup power for the volatile memory locations during mains failure. In an exemplary embodiment the interrupt routine initiates a sleeping state managed by an operating system. In one embodiment the interrupt is coded as an SMI.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A system for placing and maintaining a computer in a standby mode during power failure, said system comprising:
   a means for sensing a failure of mains power;
   a powered device controller comprising a maintain power signature functionality, said powered device controller arranged to receive power over communication cabling, said maintain power signature functionality operative to ensure that at all times sufficient power is drawn via said communication cabling so that power is not disconnected, said powered device controller operative to provide a standby power for the computer derived from said power received over communication cabling, said provided standby power less than the power required for full operation of the computer;

a volatile memory arranged to be powered from said powered device controller; and a processor, said processor being operative responsive to said means for sensing a failure to store status information on said volatile memory and reduce power demand of the computer to be no more than said standby power available from said powered device controller.

2. A system according to claim 1, further comprising a power supply exhibiting a first power output and at least one second power output, said power supply being responsive to a signal from said processor to disable power to at least one of said second power outputs while powering said first power output, said power supply being arranged to receive power from said powered device controller in the event of a sensed failure of mains power, said volatile memory being arranged to be powered via said first power output thereby being powered via said powered device controller.

3. A system according to claim 2, wherein said power supply responsive to said signal is operative to reduce said power demand to less than the amount of power available from said powered device controller.

4. A system according to claim 1, wherein said processor is operative responsive to said means for sensing a failure via a system management interrupt.

5. A system according to claim 1, wherein said processor is operative responsive to said means for sensing a failure via an interrupt.

6. A system according to claim 1, further comprising a DC/DC converter associated with said powered device controller, said volatile memory being powered from said powered device controller being powered via said DC/DC converter.

7. A system according to claim 1, wherein said processor is operative to store said status information within 17 milliseconds of said sensed failure of mains power.

8. A system according to claim 1, wherein said volatile memory comprises a disk cache.

9. A system according to claim 1, wherein said status information comprises at least some contents of a video memory.

10. A system according to claim 1, wherein said status information comprises a configuration of at least one of a network card and a sound card.

11. A system according to claim 1, further comprising a means for sensing said received power over communication cabling, said processor being operative responsive to said means for sensing a failure and said means for sensing said received power.

12. A system according to claim 1, wherein said powered device controller meets the 802.3af-2003 standard.

13. A system according to claim 1, wherein said means for sensing a failure comprises an analog to digital converter, said means for sensing a failure being operative to compare an output of said analog to digital converter to a reference.

14. A system according to claim 1, wherein said means for sensing a failure comprises a digital to analog converter, said means for sensing a failure being operative to compare an output of said converter to a signal responsive to said mains power.

15. A system according to claim 1, wherein said processor is operative in a kernel mode to store said status information.

16. A system according to claim 1, wherein said processor is operative under a BIOS routine to store said status information.

17. A system according to claim 1, further comprising a means for sensing restoration of said failed mains power, said processor being operative responsive to said means for sensing restoration to retrieve said status information from said volatile memory.

18. A system for placing and maintaining a computer in a standby mode during power failure, said system comprising:

a means for sensing a failure of mains power;

a flywheel energy storage system of the micro-electromechanical system (MEMS) variety operative to provide a standby power less than the power required for full operation of the computer;

a volatile memory arranged to be powered from said powered device controller; and a processor, said processor being operative responsive to said means for sensing a failure to store status information on said volatile memory and reduce power demand of the computer to be no more than said standby power available from said flywheel energy storage system.

19. A system operative to place and maintain a computer in a standby mode during power failure, said system comprising:

a mains power failure sensor;

a flywheel energy storage system of the micro-electromechanical system (MEMS) variety arranged to provide a standby power less than the power required for full operation of the computer;

a volatile memory arranged to be powered from said provided standby power in the event of a failure of mains power; and a processor operative responsive to said mains power failure sensor to store status information on said volatile memory and reduce power demand of said processor and associated devices to no more than that available from said provided standby power of said flywheel energy system.

20. A method of backing up a computer in the event of mains power failure, the method comprising:

providing a source of standby power comprising a flywheel energy storage system of the micro-electromechanical system (MEMS) variety;

providing a volatile memory;

sensing a failure of mains power;

interrupting a processor responsive to said sensing;

storing status information associated with the processor on said provided volatile memory; and powering said volatile memory from said provided source of standby power thereby retaining said stored status information during said sensed failure of mains power.

21. A system operative to place and maintain a computer in a standby mode during power failure, said system comprising:

a mains power failure sensor;

a powered device controller exhibiting a maintain power signature functionality and arranged to receive power over communication cabling, said maintain power signature functionality operative to ensure that sufficient minimum power is drawn via the communication cabling at all times so that power is not disconnected, said powered device controller operative to provide a standby power for the computer derived from said power received over communication cabling, said provided standby power less than the power required for full operation of the computer;
a volatile memory arranged to be powered from said provided standby power in the event of a failure of mains power; and
a processor operative responsive to said mains power failure sensor to store status information on said volatile memory and reduce power demand of said processor and associated devices to no more than that available from said provided standby power of said powered device controller.

22. A system according to claim 21, wherein said processor is operative responsive to said mains power failure sensor via a system management interrupt.

23. A system according to claim 21, wherein said processor is operative in one of a kernel mode and a BIOS routine responsive to said mains power failure sensor.

24. A system according to claim 21, further comprising a mains power restoring sensor, said processor being further operative responsive to said mains power restoring sensor to restore said status information from said volatile memory.

25. A system according to claim 21, wherein said processor is operative to restore said status information without requiring a reboot of the computer.

26. A system according to claim 21, further comprising a voltage converter, said volatile memory being powered in the event of said mains power failure from said powered device controller via said voltage converter.

27. A method of backing up a computer in the event of mains power failure, the method comprising:
providing a source of standby power comprising a powered device controller exhibiting a maintain power signature functionality and arranged to received power over communication cabling, said maintain power signature functionality drawing, at all times, sufficient minimum power via the communication cabling so that power is not disconnected, said source of standby power deriving the standby power from said received power over communication cabling;
providing a volatile memory;
sensing a failure of mains power;
interrupting a processor responsive to said sensing;
storing status information associated with the processor on said provided volatile memory; and
powering said volatile memory from said provided source of standby power thereby retaining said stored status information during said sensed failure of mains power.

28. A method according to claim 27, wherein said interrupting is via a system management interrupt.

29. A method according to claim 27, further comprising:
providing a power supply exhibiting a first power output and at least one second power output;
in the event of said failure of mains power, powering said provided power supply from said source of standby power; and
disabling power to at least one of said second power outputs while powering said first power output,
wherein said powering said volatile memory from said source of standby power is at least partially via said power supply.

30. A method according to claim 29, wherein said disabling power reduces the power demand of the computer to less than the amount of power available from said source of standby power.

31. A method according to claim 27, further comprising:
providing a voltage converter associated with said provided source of standby power, wherein said powering said volatile memory from said provided source of standby power is at least partially via said provided voltage converter.

32. A method according to claim 27, wherein said storing status information is accomplished within 17 milliseconds of said sensed failure of mains power.

33. A method according to claim 27, wherein said volatile memory comprises a disk cache.

34. A method according to claim 27, wherein said status information comprises at least some contents of a video memory.

35. A method according to claim 27, wherein said status information comprises a configuration of at least one of a network card and a sound card.

36. A method according to claim 27, wherein said storing is accomplished by said processor operative in one of a kernel mode and a BIOS routine.

37. A method according to claim 27, further comprising:
sensing restoration of said failed mains power; and
retrieving said status information from said volatile memory.

* * * * *